US009431810B2

(12) United States Patent
Luthi et al.

(10) Patent No.: US 9,431,810 B2
(45) Date of Patent: Aug. 30, 2016

(54) LINE MOUNTING SYSTEM

(75) Inventors: Benjamin Luthi, Bonney Lake, WA (US); Wayne Frederick Gerhart, Auburn, WA (US)

(73) Assignee: THE BOEING COMPANY, Chicago, IL (US)

(*) Notice: Subject to any disclaimer, the term of this patent is extended or adjusted under 35 U.S.C. 154(b) by 373 days.

(21) Appl. No.: 13/546,630

(22) Filed: Jul. 11, 2012

(65) Prior Publication Data
US 2014/0014775 A1 Jan. 16, 2014

(51) Int. Cl.
| | |
|---|---|
| F16M 3/00 | (2006.01) |
| H02G 3/32 | (2006.01) |
| H02G 5/00 | (2006.01) |
| B64C 1/40 | (2006.01) |
| H02G 3/36 | (2006.01) |
| F16L 3/23 | (2006.01) |

(52) U.S. Cl.
CPC .................. *H02G 3/32* (2013.01); *H02G 5/00* (2013.01); *B64C 1/406* (2013.01); *F16L 3/23* (2013.01); *H02G 3/36* (2013.01)

(58) Field of Classification Search
CPC .......... B64C 1/406; H02G 3/32; H02G 3/26; H02G 5/00; F16L 3/23; F16L 3/24; F16L 3/012; Y02T 50/46; B64D 47/00; B65H 54/02
USPC ............ 248/68.1, 74.1, 53, 58, 70, 72, 74.4, 248/74.2; 174/68.1, 72 A, 101, 135; 242/615.2, 557, 472, 472.8, 597.4
See application file for complete search history.

(56) References Cited

U.S. PATENT DOCUMENTS

| | | | |
|---|---|---|---|
| 3,632,069 A * | 1/1972 | Thayer et al. .................. 248/56 |
| 5,127,062 A | 6/1992 | Cerda | |
| 5,217,207 A * | 6/1993 | Schmader et al. ..... 254/134.3 R |
| 5,388,790 A | 2/1995 | Guthke et al. | |
| 5,538,208 A | 7/1996 | Cordes et al. | |
| 6,994,300 B2 * | 2/2006 | Labeirie et al. ................. 248/70 |
| 7,534,958 B2 * | 5/2009 | McNutt et al. .............. 174/68.1 |
| 7,654,492 B2 * | 2/2010 | Balderama et al. ............ 248/72 |
| 8,087,621 B2 | 1/2012 | Sayilgan et al. | |
| 8,242,367 B2 * | 8/2012 | Guthke et al. .............. 174/72 A |
| 8,651,435 B2 * | 2/2014 | Guthke et al. .................. 248/70 |

(Continued)

FOREIGN PATENT DOCUMENTS

| | | |
|---|---|---|
| DE | 102007060030 A1 | 12/2008 |
| EP | 2399823 A1 | 12/2011 |

OTHER PUBLICATIONS

PCT search report dated Oct. 24, 2013 regarding application PCT/US2013/045036, filing date Jun. 10, 2013, applicant The Boeing Company, 9 pages.
"Digital Versus Analog In-Flight Entertainment and Cabin Management Systems," The In-Flight Entertainment Spot blog, Jul. 2011, 2 Pages, accessed Jul. 10, 2012, http://inflightentertainmentspot.blogspot.com/2011/07/digital-versus-analog-in-flight.html.

(Continued)

*Primary Examiner* — Tan Le
(74) *Attorney, Agent, or Firm* — Yee & Associates, P.C.

(57) ABSTRACT

A method and apparatus for mounting lines in an aircraft. A line mounting system for the aircraft comprises support structures and spacers. The support structures are configured to slide into positions relative to attachment structures in the aircraft and connect to the attachment structures in the positions. The spacers are associated with the support structures. A number of lines is configured to be connected to the spacers. The number of lines is held in a desired configuration in the aircraft when the support structures are secured to the attachment structures.

21 Claims, 22 Drawing Sheets

(56) References Cited

U.S. PATENT DOCUMENTS

| | | |
|---|---|---|
| 2005/0242245 A1 | 11/2005 | Balderama et al. |
| 2006/0196988 A1* | 9/2006 | Kurzyniec ................. 242/588.2 |
| 2009/0159750 A1 | 6/2009 | Sayilgan et al. |
| 2011/0006169 A1* | 1/2011 | Abbott ........................ 248/74.4 |

OTHER PUBLICATIONS

International Preliminary Report on Patentability, dated Jan. 22, 2015, regarding Application No. PCT/US2013/045036, 7 pages.

* cited by examiner

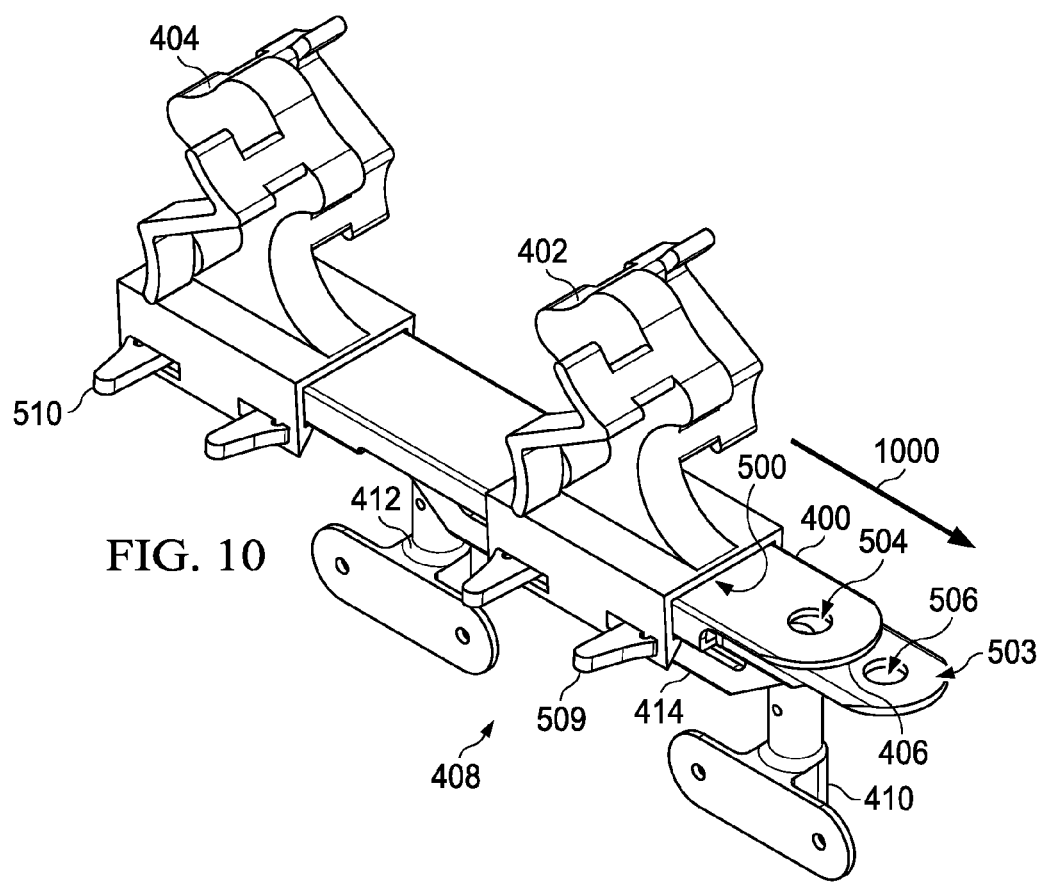

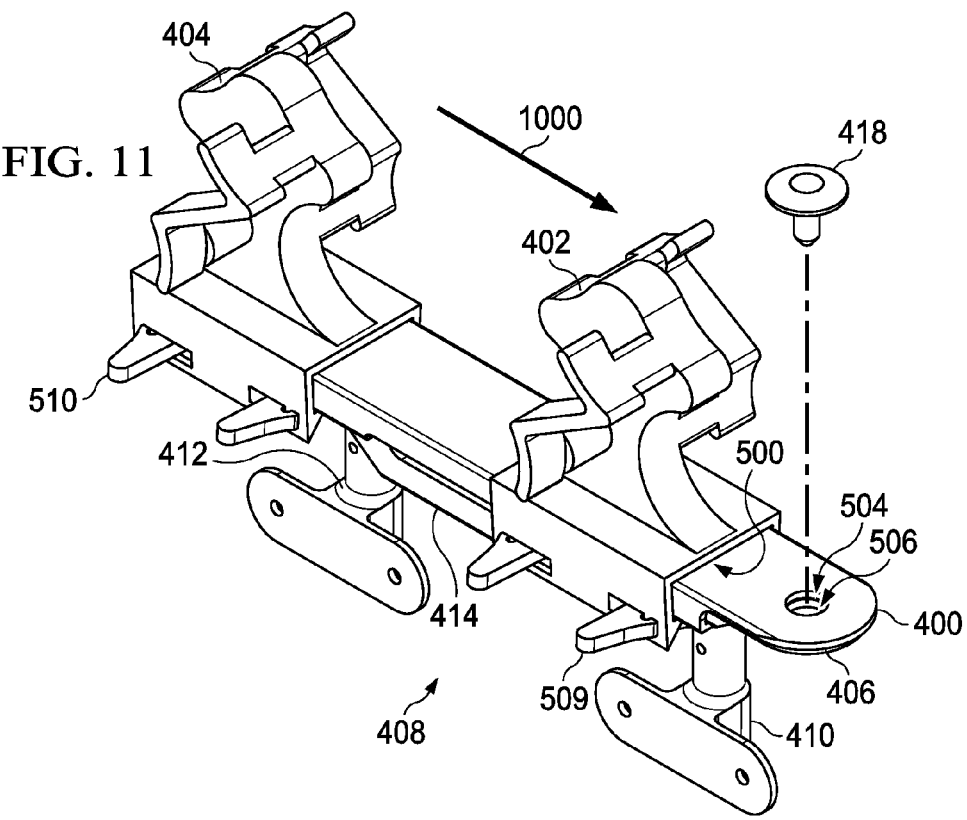
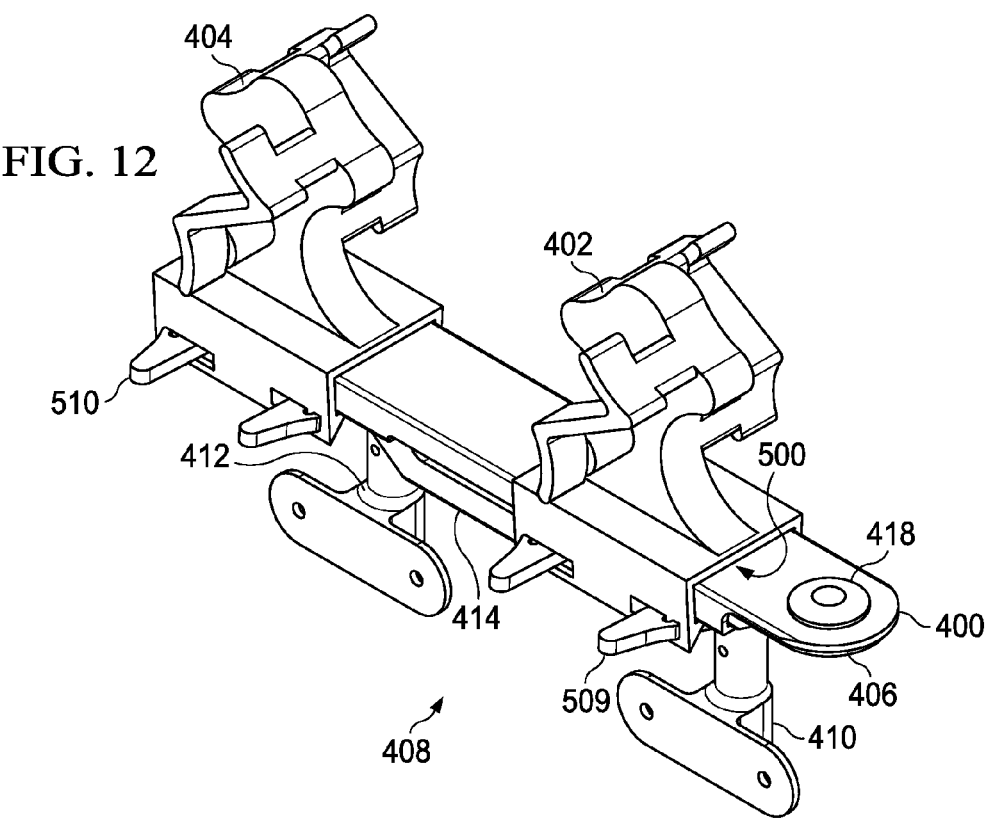

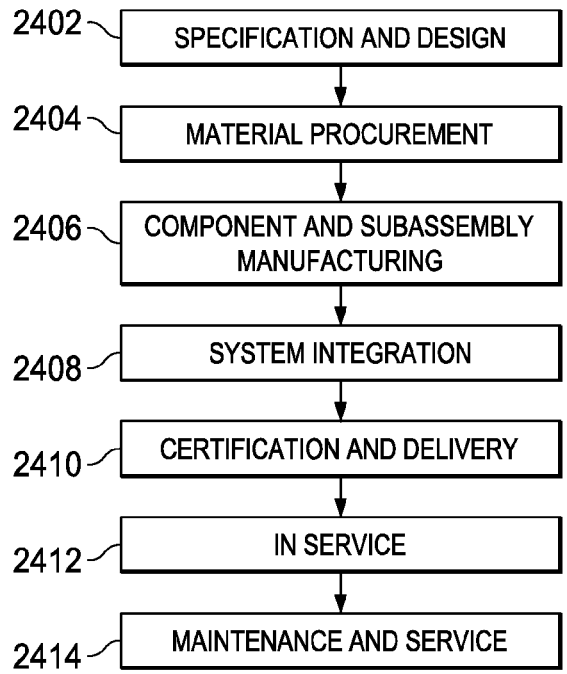
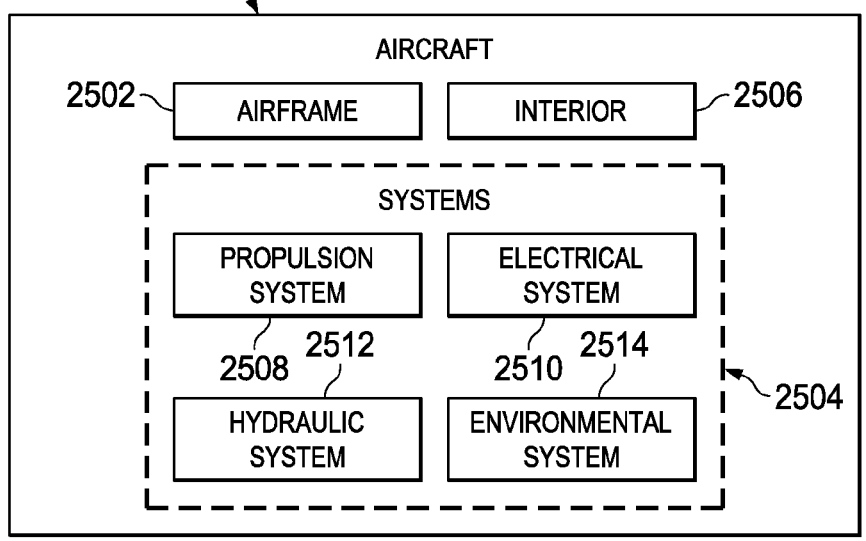

LINE MOUNTING SYSTEM

BACKGROUND INFORMATION

1. Field

The present disclosure relates generally to line systems for platforms and, in particular, to line mounting systems for platforms. Still more particularly, the present disclosure relates to a method and apparatus for mounting wire bundles in an aircraft.

2. Background

An aircraft has many wires that extend through different parts of the fuselage, wing, and other sections of the aircraft. These wires may be used to distribute power, exchange data, or a combination of the two.

These wires may extend through the entire length of the aircraft or through a portion of an aircraft structure. When installed in an aircraft, these wires may be in the form of bundles that provide power or data to the aircraft. When many wire bundles are present, these wire bundles are bound together by fasteners. These fasteners may be, for example, straps, cable ties, cable lacing, sleeves, or a combination thereof to form a wiring assembly.

This wiring assembly is connected to the aircraft structure using a bracket, clamp, or some other type of fastener system. For example, a sponge clamp may be used to support a bundle of wires in the aircraft. The sponge clamp is a rigid structure that may have a U-shape with a sponge material. The sponge material in the sponge clamp may press the wires in the wire bundle together when the clamp is connected to a structure in the aircraft.

Connecting these wire bundles to a sponge clamp may take more time and effort than desired. For example, operators may use tools to secure these wire bundles to the sponge clamp. Further, different numbers of wire bundles may be connected to an aircraft structure at different times during the installation of wiring in the aircraft. For example, operators may manually connect a first number of wire bundles to the sponge clamps along the entire length of the fuselage before connecting a second number of wire bundles at the same locations as the first number of wire bundles.

In this instance, more work is performed to add the second number of wire bundles. When additional wires are to be added to the bundle, or if additional wire bundles are to be added, the clamp is removed and the new wires are placed in. As part of this process, a operator may replace or modify the cable ties around a wire bundle, or the operator may secure new cable ties around the wire bundles in the wiring assembly. These operations may be more time-consuming, expensive, and/or tedious than desired.

Thus, current techniques for mounting lines, such as wire bundles, in an aircraft may increase the time needed to complete manufacturing of an aircraft more than desired. Therefore, it would be desirable to have a method and apparatus that takes into account at least some of the issues discussed above, as well as other possible issues.

SUMMARY

In one illustrative embodiment, a line mounting system for an aircraft comprises support structures and spacers. The support structures are configured to slide into positions relative to attachment structures in the aircraft and connect to the attachment structures in the positions. The spacers are associated with the support structures. A number of lines is configured to be connected to the spacers. The number of lines is held in a desired configuration in the aircraft when the support structures are secured to the attachment structures.

In another illustrative embodiment, a method for mounting lines in an aircraft is present. Attachment structures are associated with an interior of a fuselage of the aircraft. Support structures are moved to positions relative to the attachment structures. The support structures are connected to the attachment structures when the support structures are in the positions relative to the attachment structures such that a number of lines has a desired configuration in the fuselage of the aircraft when connected to spacers.

In yet another illustrative embodiment, a method for mounting lines in a platform is provided. Support structures are positioned relative to attachment structures associated with the platform. Spacers are associated with the support structures and the spacers are configured to be connected to a number of lines. The support structures are connected to the attachment structures such that the number of lines has a desired configuration when connected to the spacers.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 8-12 are illustrations of an installation of a line mounting system for wire bundles in accordance with an illustrative embodiment;

FIG. 24 is an illustration of an aircraft manufacturing and service method in accordance with an illustrative embodiment; and FIG. 25 is an illustration of an aircraft in which an illustrative embodiment may be implemented.

DETAILED DESCRIPTION

The illustrative embodiments recognize and take into account that a first set of wire bundles may be mounted along the entire surface of the aircraft before a second set of wire bundles is installed at the same locations as the first set of wire bundles. With the current process, modifications must be made to accommodate the second set of wire bundles. These modifications may take more time and effort than desired to perform.

The illustrative embodiments also recognize and take into account that the installation of wire bundles may include having to see whether the support structures to be installed line up with channels in the body of the aircraft. For example, during installation, an operator may have to visually confirm that the support structure being installed is aligned with a channel to connect the support structure to the aircraft. This may be time-consuming and tedious.

The illustrative embodiments also recognize and take into account that a minimum desired distance may be maintained between wire bundles. For example, a minimum distance between a first set of wire bundles and a second set of wire bundles may need to be present for the wiring assembly to function as desired. The minimum distance may, for example, reduce interference between wires.

The illustrative embodiments also recognize and take into account that the process for installation of these wire bundles in an aircraft may require the use of tools. The use of tools may be more expensive than desired. Further, operators may have to wait for tools and/or find particular tools to complete the mounting process. Additionally, during maintenance and rework, tools may be needed to modify wire bundles and other components in the wiring assembly. The need for tools during maintenance and rework may increase the time an aircraft is out of service.

Thus, the illustrative embodiments provide a method and apparatus for mounting lines in an aircraft. A line mounting system comprises support structures and spacers. The support structures are configured to slide into positions relative to attachment structures in the aircraft and connect to the attachment structures in the positions. The spacers are associated with the support structures and a number of lines is configured to be connected to the spacers. The number of lines is held in a desired configuration in the aircraft when the support structures are secured to the attachment structures.

Figure 1:
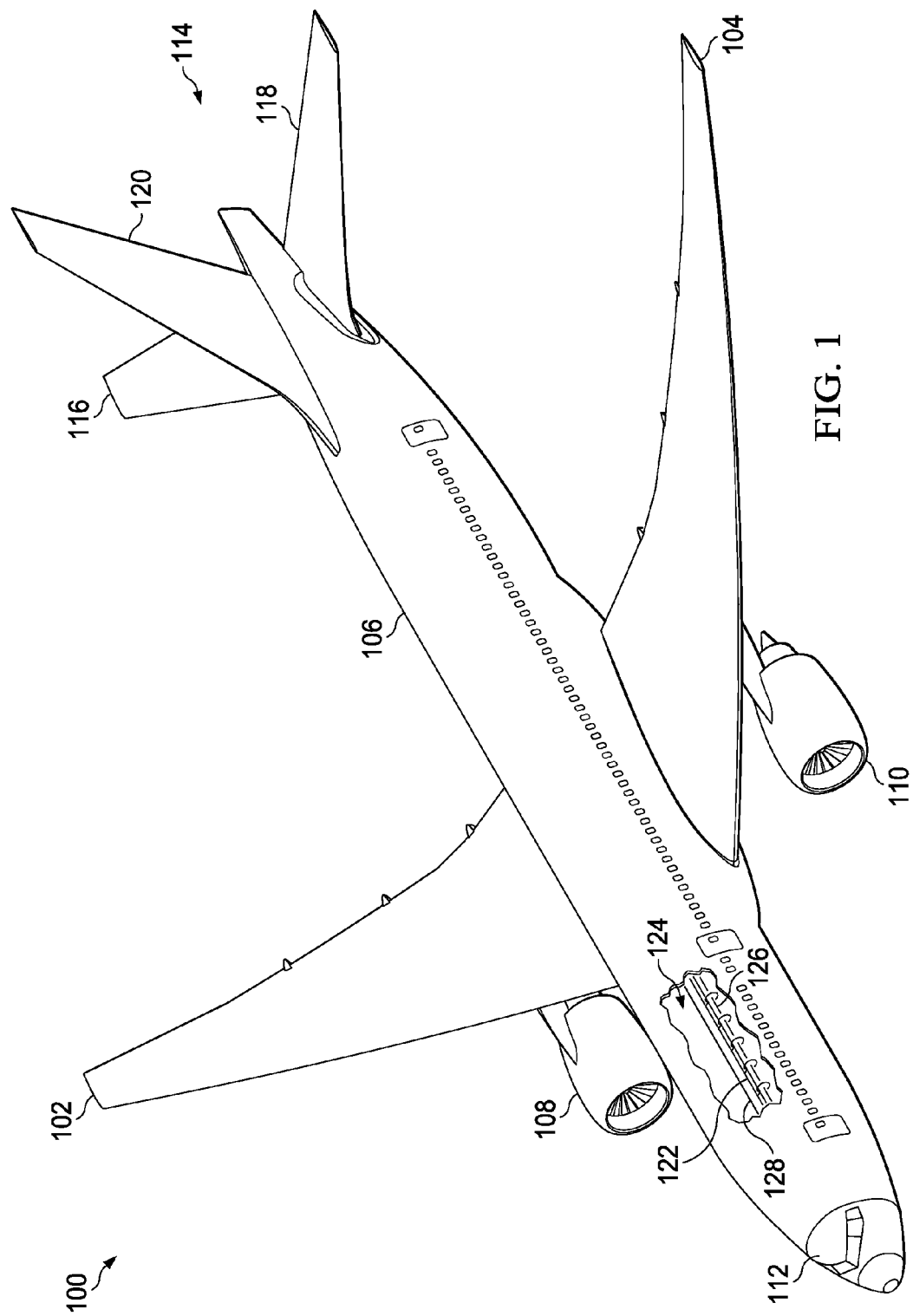
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has nose section 112 and tail section 114. Horizontal stabilizer 116, horizontal stabilizer 118, and vertical stabilizer 120 are attached to tail section 114 of body 106.

Aircraft 100 is an example of an aircraft in which line mounting system 122 may be implemented. In this illustrative example, line mounting system 122 is located in interior 124 of aircraft 100 in this exposed view. Line mounting system 122 is configured to mount wire bundles 126. As depicted, wire bundles 126 are shown in phantom as being mounted under floor 128 within interior 124 of aircraft 100 using line mounting system 122.

Figure 2:
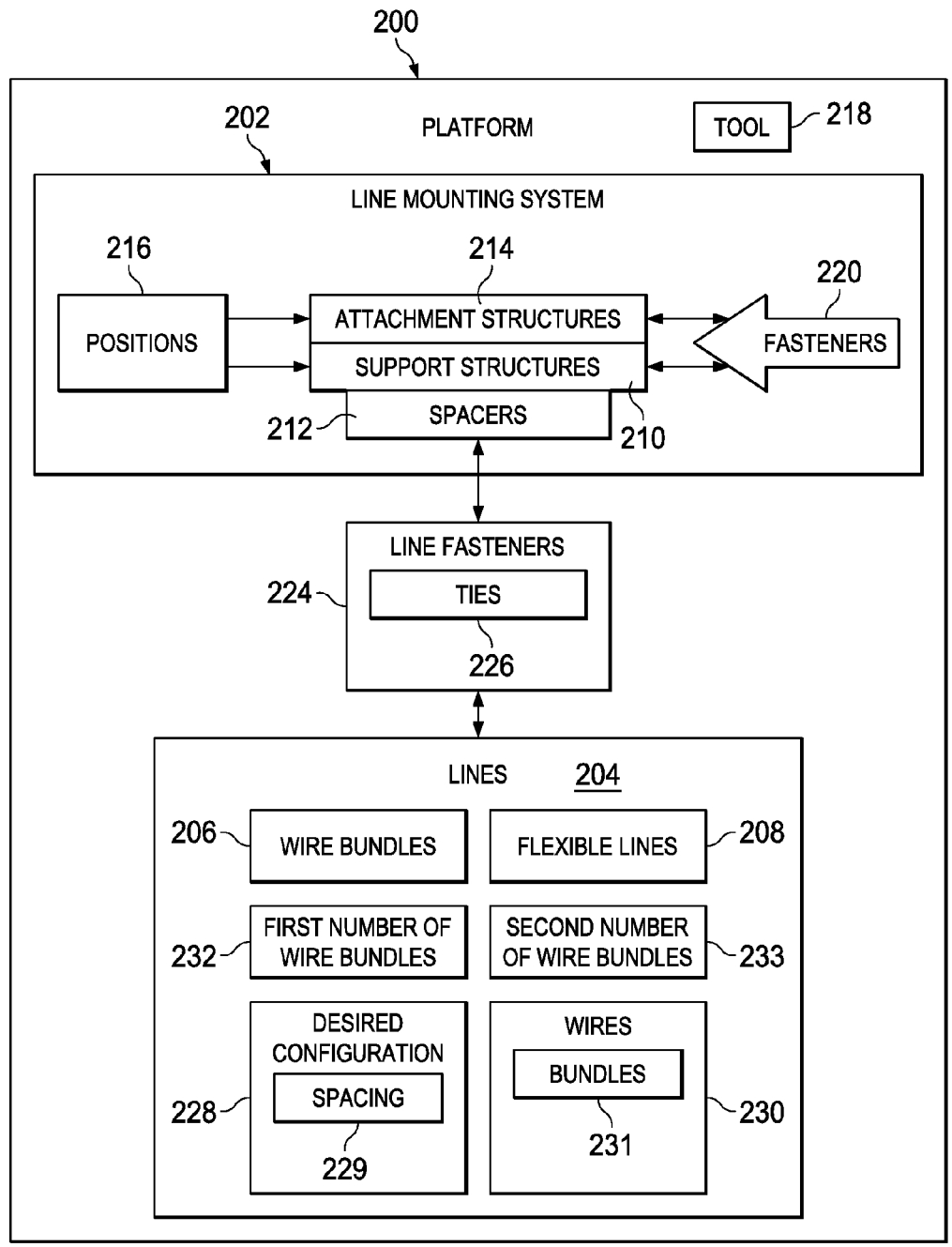
FIG. 2 is an illustration of a block diagram of a platform in accordance with an illustrative embodiment.

Turning now to FIG. 2, an illustration of a block diagram of a platform is depicted in accordance with an illustrative embodiment. In this illustrative example, aircraft 100 is an example of one implementation for platform 200 in FIG. 2.

Line mounting system 202 may be used to mount a number of lines 204 to platform 200. As used herein, a "number of" when used with reference to items means one or more items. For example, the number of lines 204 is one or more lines. Lines 204 may be grouped into wire bundles 206 in these illustrative examples.

As depicted, lines 204 may take various forms. For example, lines 204 may be any type of transport element. A transport element is a structure that is configured to transport items such as a fluid, light, an electrical signal, and other suitable items. Lines 204 may be selected from, for example, without limitation, at least one of a wire, an optical fiber, a fluid line, and other suitable types of lines. In these illustrative examples, lines 204 are flexible lines 208.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In this illustrative example, line mounting system 202 is comprised of support structures 210 and spacers 212. Spacers 212 are structures that are associated with support structures 210. In some illustrative examples, spacers 212 may be considered features of support structures 210.

When one component is "associated" with another component, the association is a physical association in these depicted examples. For example, a first component, a spacer in spacers 212, may be considered to be associated with a second component, a support structure in support structures 210, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

Spacers 212 are configured to hold a number of lines 204. In these illustrative examples, spacers 212 may be configured to hold multiple wire bundles in wire bundles 206.

Support structures 210 are configured to be connected to attachment structures 214. As used herein, a first component "connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

Support structures 210 are configured to be moved into positions 216 relative to attachment structures 214. Attachment structures 214 are also part of line mounting system 202 in this illustrative example.

When support structures 210 are in positions 216 relative to attachment structures 214, support structures 210 may be connected to attachment structures 214. In these illustrative examples, support structures 210 may be connected to attachment structures 214 without needing tool 218.

In these illustrative examples, support structures 210 may be connected to attachment structures 214 using fasteners 220. Fasteners 220 may be selected as ones that do not require tool 218. For example, fasteners 220 may take the form of scrivets that do not require the use of tools such as tool 218. In these illustrative examples, lines 204 may be connected to spacers 212 using a number of different types of connection systems. In these illustrative examples, line fasteners 224 may be used to connect lines 204 to spacers 212.

Line fasteners 224 may take a number of different forms. For example, line fasteners 224 may take the form of ties 226. As an example, ties 226 may be cables ties, zip ties, and other suitable types of ties.

In these illustrative examples, when lines 204 are connected to spacers 212 and support structures 210 are connected to attachment structures 214, lines 204 may have desired configuration 228. Desired configuration 228 may be described using a number of different parameters. For example, desired configuration 228 may be spacing 229 between one or more of lines 204 within line mounting system 202.

Spacing 229 may be desirable when lines 204 take the form of wires 230. The value for spacing 229 between wires 230 may be selected such that a desired minimum distance is maintained between lines 204. This desired minimum distance may reduce interference between wires 230. In particular, the spacing may be between bundles 231 of wires 230. Spacing 229 may be specified by various regulations, rules, and other factors. In other illustrative examples, desired configuration 228 may be a location of lines 204 relative to other components in platform 200. For example, desired configuration 228 may be located in an interior of a fuselage of aircraft 100 in FIG. 1.

In these illustrative examples, first number of wire bundles 232 may be connected to spacers 212 prior to support structures 210 being connected to attachment structures 214. In these illustrative examples, after support structures 210 have been connected to attachment structures 214 in platform 200, second number of wire bundles 233 may be connected to spacers 212. With line mounting system 202, removing ties 226 that secure first number of wire bundles 232 to each other and to spacers 212 may be unnecessary. Additional ties in ties 226 may be used to connect second number of wire bundles 233 to spacers 212. In this manner, less time and effort is needed to attach lines 204 in desired configuration 228 in platform 200 as compared to currently used techniques and systems.

Figure 3:
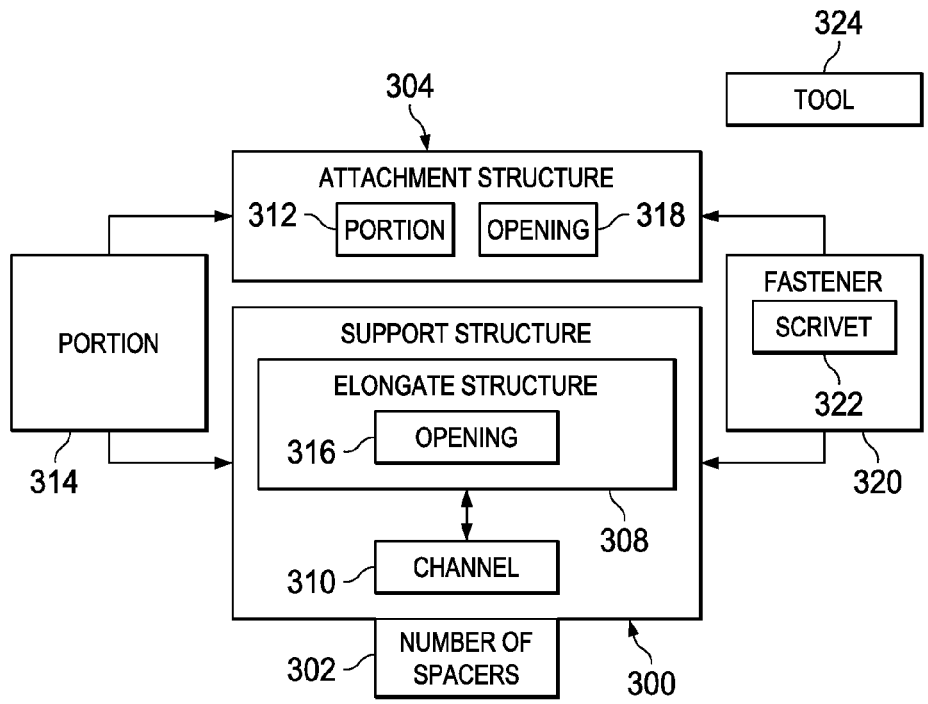
FIG. 3 is an illustration of a block diagram of a support structure with a number of spacers and an attachment structure in accordance with an illustrative embodiment.

Turning now to FIG. 3, an illustration of a block diagram of a support structure with a number of spacers and an attachment structure is depicted in accordance with an illustrative embodiment. In this illustrative example, support structure 300 is an example of a support structure in support structures 210 in FIG. 2. Number of spacers 302 is an example of one or more spacers in spacers 212 in FIG. 2. Attachment structure 304 is an example of an attachment structure in attachment structures 214 in FIG. 2.

In this illustrative example, support structure 300 is associated with number of spacers 302. In other words, one or more spacers may be connected to, formed as part of, or otherwise associated with support structure 300.

In this illustrative example, support structure 300 takes the form of elongate structure 308. Additionally, support structure 300 also may include channel 310 within elongate structure 308.

In these illustrative examples, support structure 300 is configured to be moved relative to attachment structure 304. In particular, elongate structure 308 may be slid relative to attachment structure 304 with number of spacers 302. The sliding of elongate structure 308 may be such that channel 310 receives portion 312 of attachment structure 304.

Once elongate structure 308 is in position 314 relative to attachment structure 304, opening 316 in elongate structure 308 of support structure 300 and opening 318 in attachment structure 304 may be aligned with each other. With the alignment of opening 316 and opening 318, fastener 320 may be used to maintain support structure 300 in position 314 relative to attachment structure 304.

In particular, fastener 320 may be installed through opening 316 and opening 318. In this manner, fastener 320 may be used to secure or lock elongate structure 308 in position 314 with portion 312 within channel 310. In these illustrative examples, fastener 320 will take the form of scrivet 322. Scrivet 322 may be installed by an operator without the need for tool 324. In this manner, lines, such as wire bundles, may be installed more quickly and with less effort by an operator.

Further, in these illustrative examples, channel 310 may be configured such that portion 312 of attachment structure 304 halts movement of elongate structure 308 by an operator when position 314 is reached. As a result, the operator does not need to view opening 316 and opening 318 to verify that these openings are aligned with each other. This configuration of channel 310 and portion 312 may further reduce the amount of time and effort needed by an operator to install wire bundles using support structure 300.

The illustration of platform 200 with line mounting system 202 and the different components in FIG. 2 and FIG. 3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, elongate structure 308 may be connected to attachment structure 304 using other mechanisms other than installing fastener 320 into opening 316 in support structure 300 and opening 318 in attachment structure 304. For example, a fastening mechanism may be present in channel 310 that is configured to hold support structure 300 relative to attachment structure 304 in position 314.

For example, a first fastening component may be located in channel 310. This fastening component may engage another fastening component in portion 312 of attachment structure 304. When support structure 300 is in position 314 relative to attachment structure 304, these two fastening components may engage each other to hold support structure 300 in position 314 relative to attachment structure 304.

More specifically, the first fastening component may be an opening or slot formed in the wall of channel 310. The second fastening component may be a tab or other structure on attachment structure 304 that is configured to enter the opening or slot such that support structure 300 is held in a position relative to attachment structure 304 and does not move.

As another example, although platform 200 in FIG. 2 has been described as taking the form of an aircraft, in some illustrative examples, platform 200 may take other forms. For example, platform 200 may be selected from one of a mobile platform, a stationary platform, a land-based structure, an aquatic-based structure, a space-based structure, a surface ship, a tank, a personnel carrier, a train, a spacecraft, a space station, a satellite, a submarine, an automobile, a power plant, a bridge, a dam, a manufacturing facility, and a building.

Figure 4:
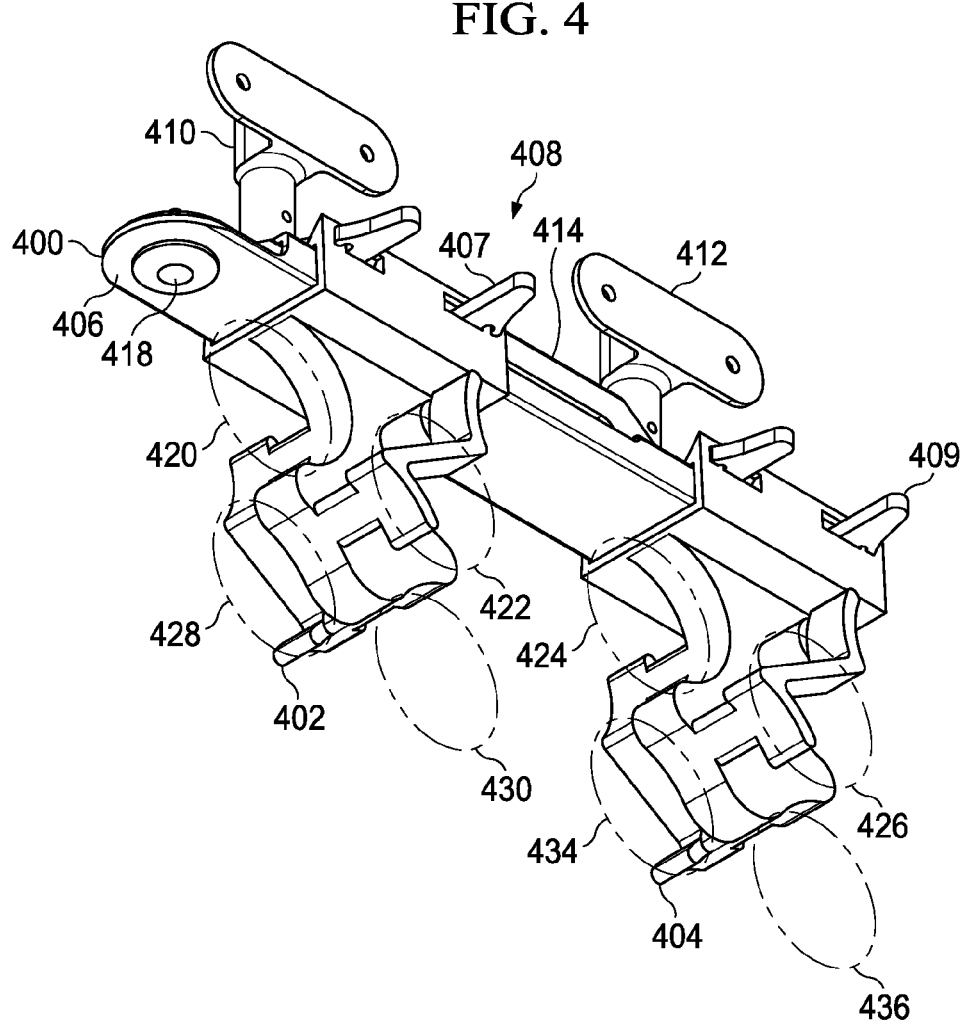
FIG. 4 is an illustration of components in a line mounting system in accordance with an illustrative embodiment.

Turning now to FIG. 4, an illustration of components in a line mounting system is depicted in accordance with an illustrative embodiment. In this depicted example, support structure 400 is associated with spacer 402 and spacer 404. These components are illustrative examples of physical implementations for the components in shown in block form in FIG. 3.

As depicted, spacer 402 and spacer 404 are separate components that are connected to support structure 400. In this example, support structure 400 takes the form of elongate member 406. Spacer 402 and spacer 404 are structures configured to be connected to one or more lines. In these illustrative examples, spacer 402 and spacer 404 are associated with elongate member 406 by being connected to elongate member 406. Clip 407 connects spacer 402 to elongate member 406 and clip 409 connects spacer 404 to elongate member 406.

Elongate member 406 may be moved to a position relative to attachment structure 408. Elongate member 406 is connected to bracket 414 in attachment structure 408 using scrivet 418.

In this illustrative example, attachment structure 408 is comprised of three components. As depicted, attachment structure 408 includes post 410, post 412, and bracket 414. Bracket 414 is associated with post 410 and post 412. Attachment structure 408 may be connected to a platform, such as aircraft 100 in FIG. 1, in this illustrative example.

In this example, spacer 402 and spacer 404 have shapes configured to allow for more efficient connection of lines to the spacers. For instance, a wire bundle may be attached to location 420 and location 422 for spacer 402. Additionally, a wire bundle may be attached to location 424 and another wire bundle may be attached to location 426 on spacer 404. These wire bundles may be attached to locations 420, 422, 424, and 426 prior to elongate member 406 being attached to attachment structure 408.

After elongate member 406 has been attached to attachment structure 408, additional wire bundles may be attached to location 428 and location 430 for spacer 402. Additional wire bundles also may be attached to location 434 and location 436 for spacer 404. The attachment of these additional wire bundles may be performed after elongate member 406 has been attached to attachment structure 408. The attachment of the additional wire bundles may be performed without having to reconfigure already attached wire bundles through the use of spacer 402 and spacer 404.

Spacer 402 and spacer 404 may maintain wire bundles in a desired configuration with respect to each other. In particular, the desired configuration may be a desired spacing between wire bundles.

Figure 5:
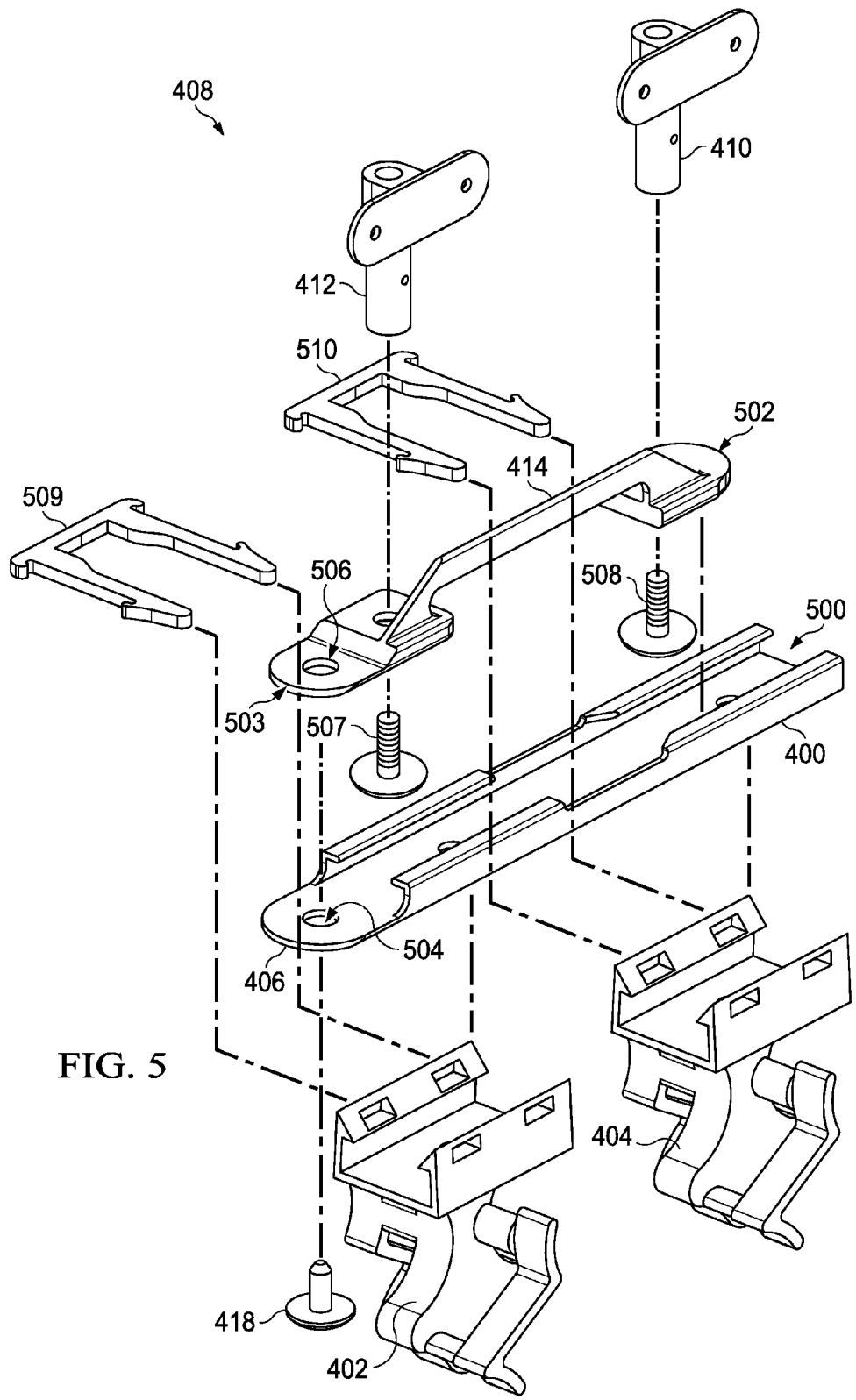
FIG. 5 is an illustration of an exploded view of a support structure with spacers and an attachment structure in accordance with an illustrative embodiment.

Turning now to FIG. 5, an illustration of an exploded view of a support structure with spacers and an attachment structure is depicted in accordance with an illustrative embodiment. In this view of support structure 400, elongate member 406 has channel 500. Channel 500 is configured to receive portion 502 and portion 503 of attachment structure 408. In this illustrative example, portion 502 and portion 503 of attachment structure 408 are part of bracket 414.

Additionally, opening 504 in elongate member 406 and opening 506 in bracket 414 in attachment structure 408 is seen. Scrivet 418 is configured to secure elongate member 406 to bracket 414 in attachment structure 408 when these two components are in a desired position relative to each other.

In this depicted example, bracket 414 is associated with post 410 and post 412 by being connected to post 410 and post 412 using fastener 507 and fastener 508. In other illustrative examples, post 410 and post 412 may be formed as part of bracket 414.

In this illustrative example, spacer 402 is associated with elongate member 406 by being connected to elongate member 406 by clip 509. In a similar fashion, spacer 404 is associated with elongate member 406 by being connected to elongate member 406 using clip 510.

Figure 6:
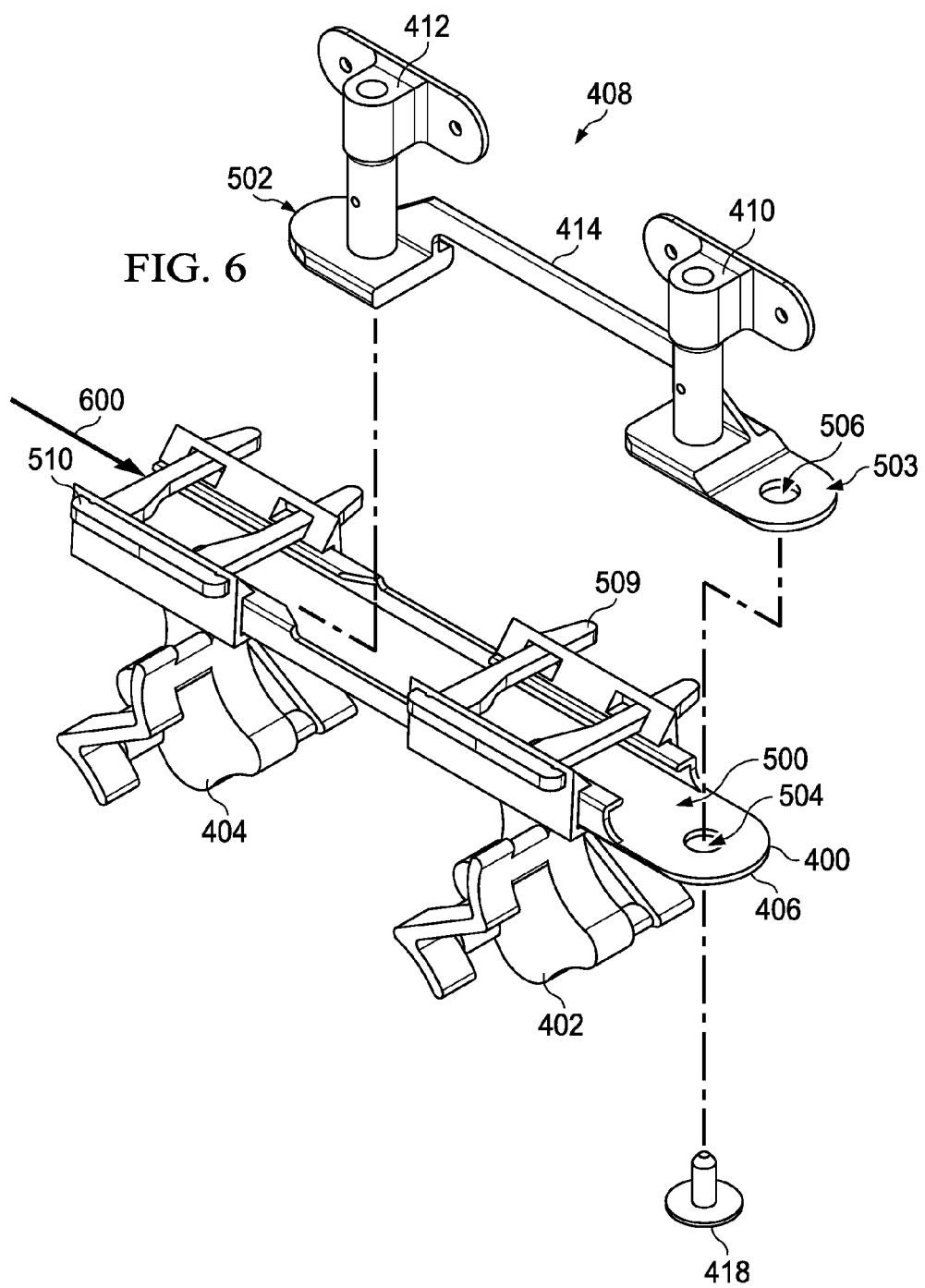
FIG. 6 is an illustration of a partially assembled view of a support structure with spacers and an attachment structure in accordance with an illustrative embodiment.

Turning now to FIG. 6, an illustration of a partially assembled view of a support structure with spacers and an attachment structure is depicted in accordance with an illustrative embodiment. As can be seen in this view, clip 509 and clip 510 also may function to stop movement of elongate member 406 relative to attachment structure 408 when portion 502 within channel 500 moves in the direction of arrow 600 to a position where opening 504 in elongate member 406 is aligned with opening 506 in bracket 414 of attachment structure 408. More specifically, post 410 may contact clip 509 and post 412 may contact clip 510 to stop movement of elongate member 406 in the direction of arrow 600.

In these illustrative examples, clip 509 and clip 510 may be considered part of a configuration for channel 500 that allows for the movement of elongate member 406 in the direction of arrow 600 to be halted.

Figure 7:
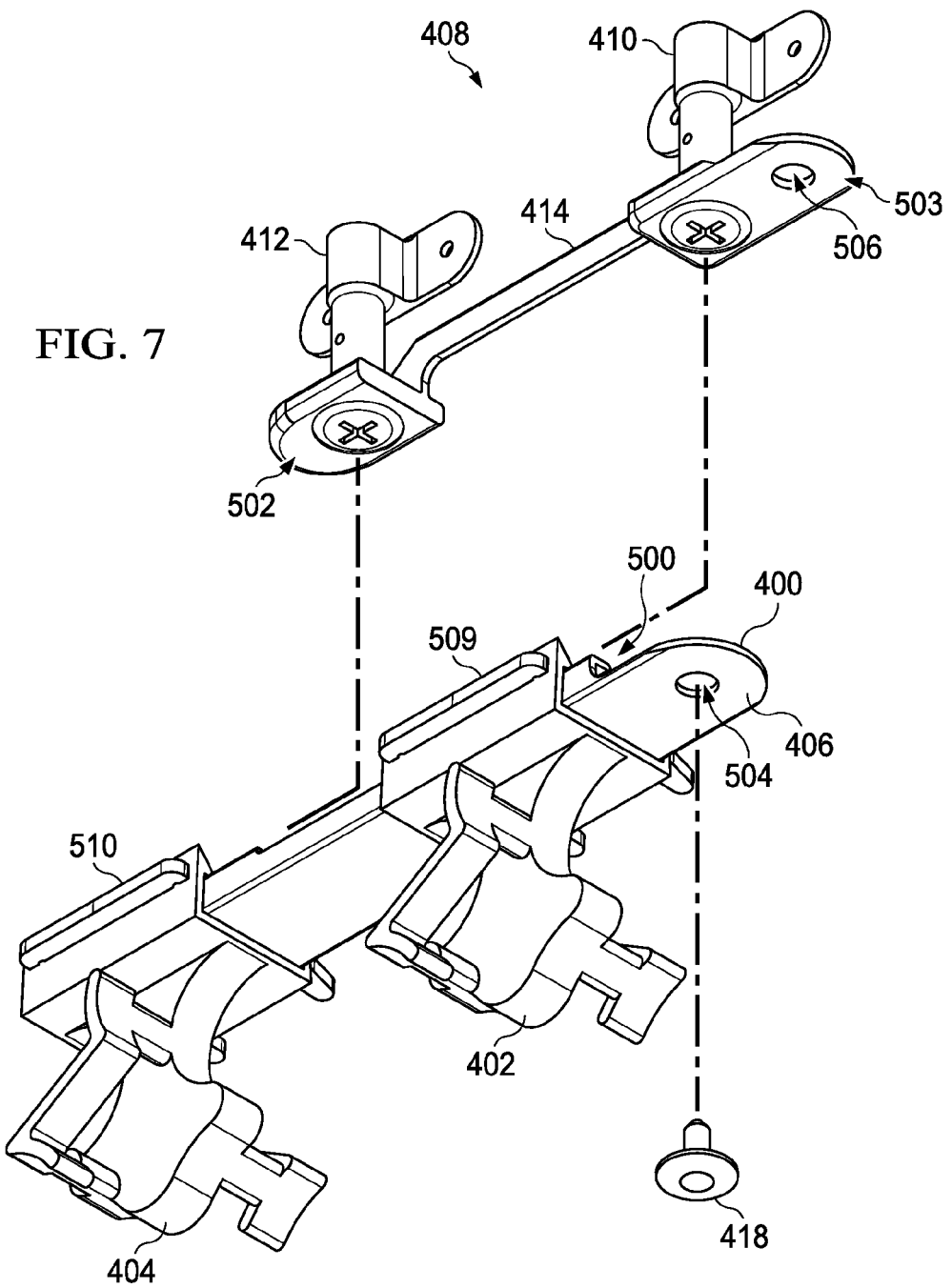
FIG. 7 is another illustration of a partially assembled view of a support structure with spacers and an attachment structure in accordance with an illustrative embodiment.

Turning now to FIG. 7, another illustration of a partially assembled view of a support structure with spacers and an attachment structure is depicted in accordance with an illustrative embodiment.

Figure 8:
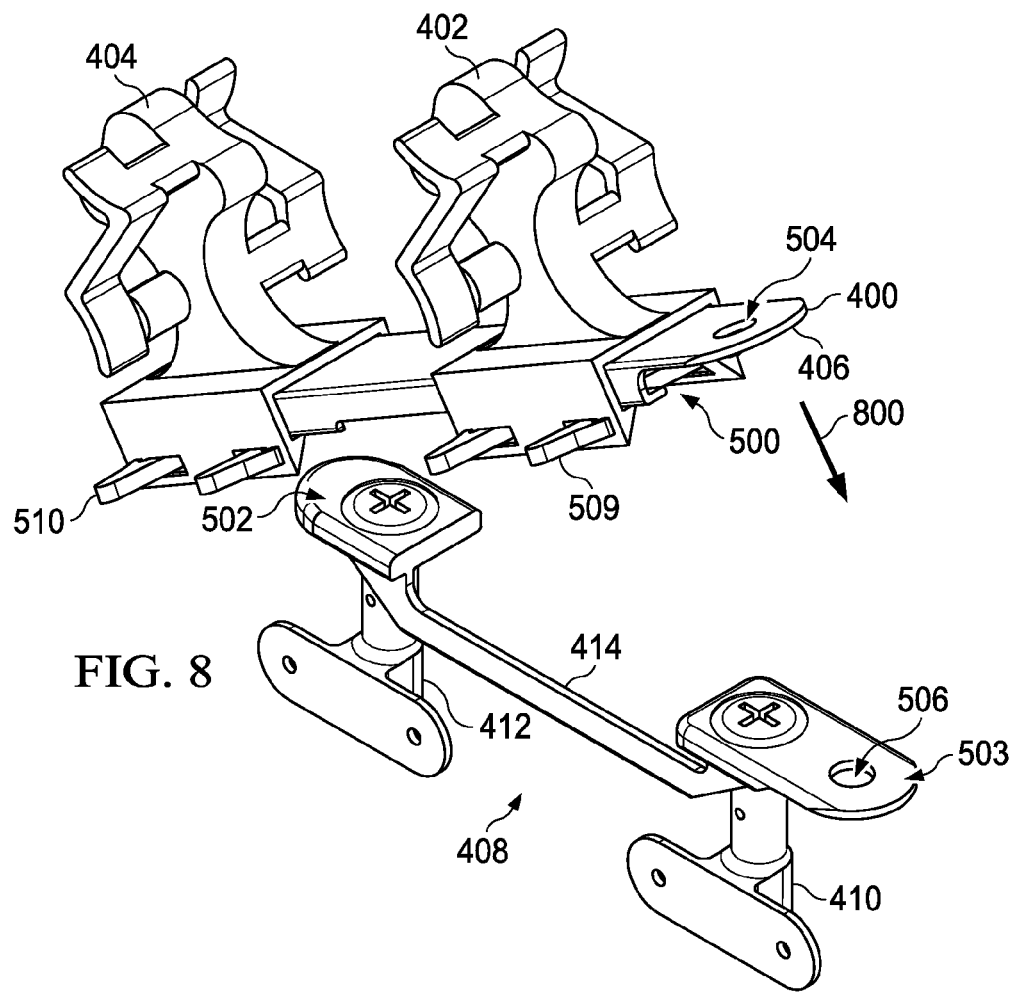
Figure 9:
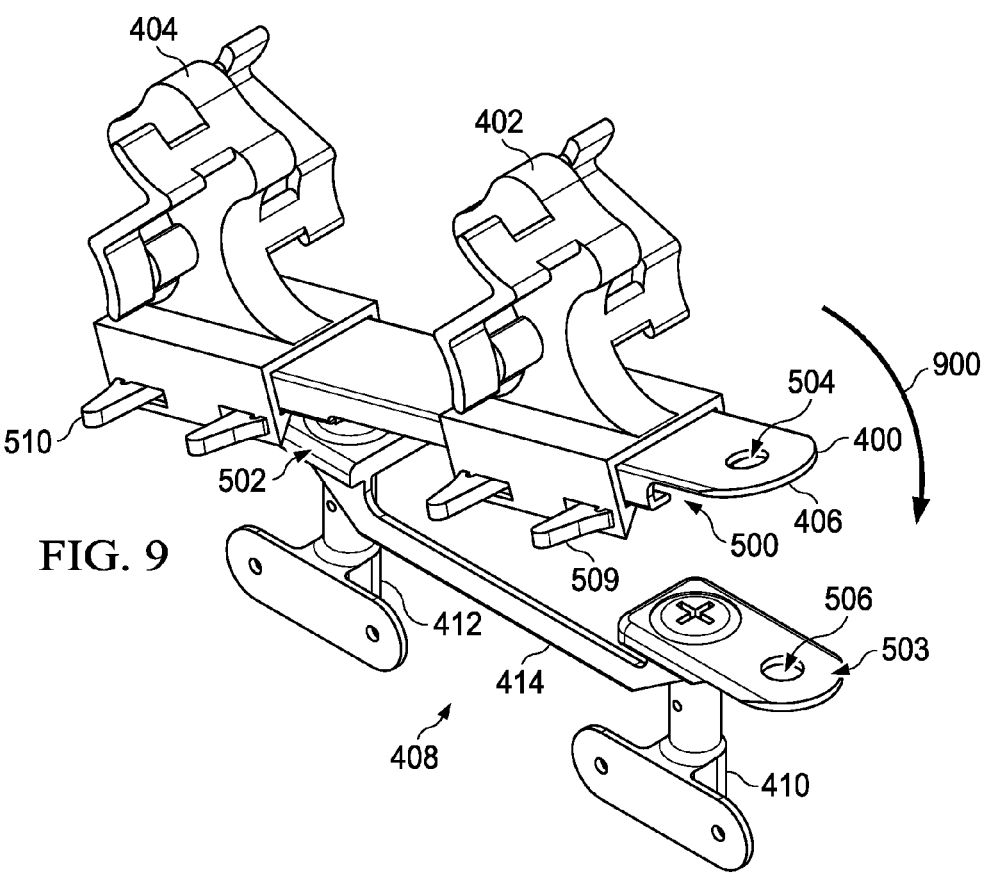

Turning next to FIGS. 8-12, illustrations of an installation of a line mounting system for wire bundles are depicted in accordance with an illustrative embodiment. In FIG. 8, elongate member 406 with spacer 402 and spacer 404 is moved in the direction of arrow 800 relative to attachment structure 408. Next, in FIG. 9, portion 503 of bracket 414 is received in channel 500 of elongate member 406. Elongate member 406 is moved or rotated in the direction of arrow 900 such that portion 502 of bracket 414 also may be received in channel 500.

In FIG. 10, both portion 502 and portion 503 are in channel 500. In this view, elongate member 406 may be moved in the direction of arrow 1000. With reference next to FIG. 11, movement of elongate member 406 halts when opening 506 in bracket 414 is aligned with opening 504 in elongate member 406. In these illustrative examples, movement in the direction of arrow 1000 no longer occurs because of the configuration of channel 500.

Scrivet 418 may be installed in opening 504 and opening 506 to secure elongate member 406 with bracket 414 in a desired position. Scrivet 418 prevents movement in the direction of arrow 1000. In FIG. 12, elongate member 406 with spacer 402 and spacer 404 are shown connected to bracket 414 of attachment structure 408.

Figure 13:
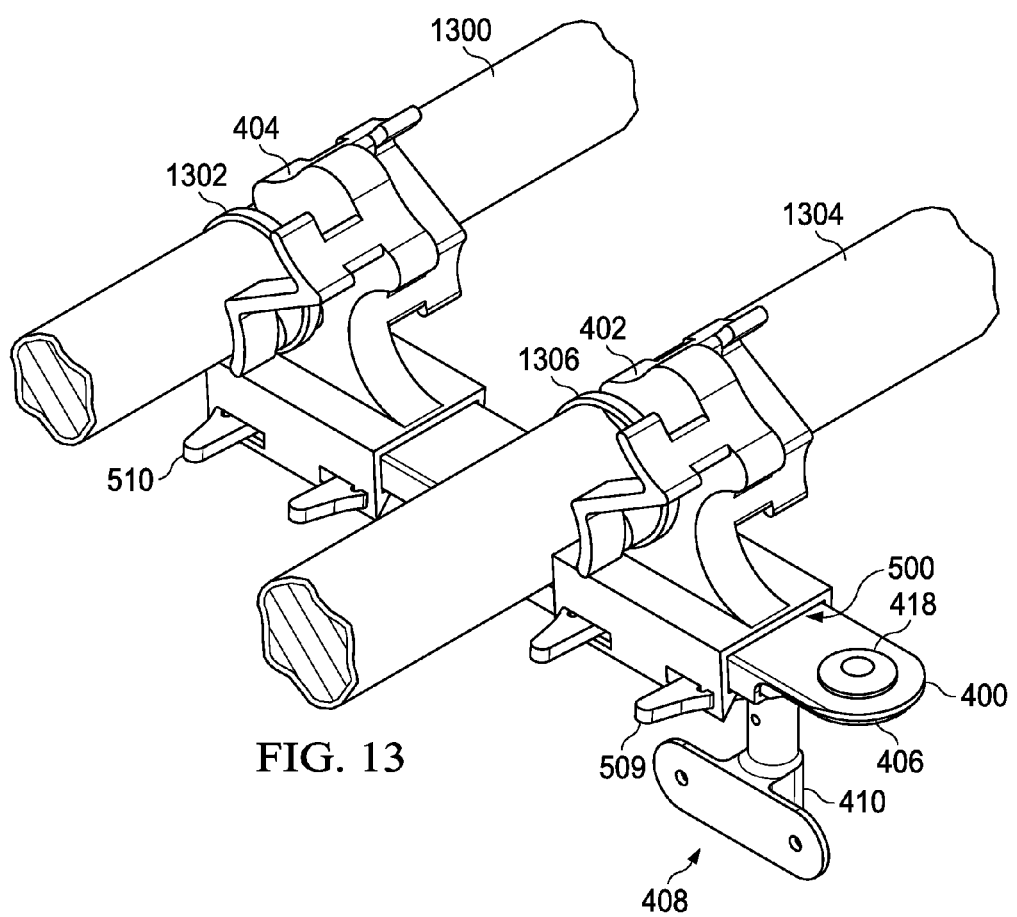
FIG. 13 is an illustration of a wire bundle connected to a support structure in accordance with an illustrative embodiment.

Turning now to FIG. 13, an illustration of a wire bundle connected to a support structure is depicted in accordance with an illustrative embodiment. In this illustrative example, wire bundle 1300 is an example of a line bundle that may be connected to elongate member 406.

In this illustrative example, wire bundle 1300 is connected to elongate member 406 through spacer 404. As depicted, wire bundle 1300 is connected to spacer 404 using tie 1302. In a similar fashion, wire bundle 1304 may be connected to elongate member 406 through spacer 402. As depicted, wire bundle 1304 is connected to spacer 402 using tie 1306. In the different illustrative examples, wire bundle 1300 may be connected to spacer 402 and wire bundle 1304 may be connected to spacer 404 after or prior to the connection of elongate member 406 to bracket 414 in these illustrative examples.

Figure 14:
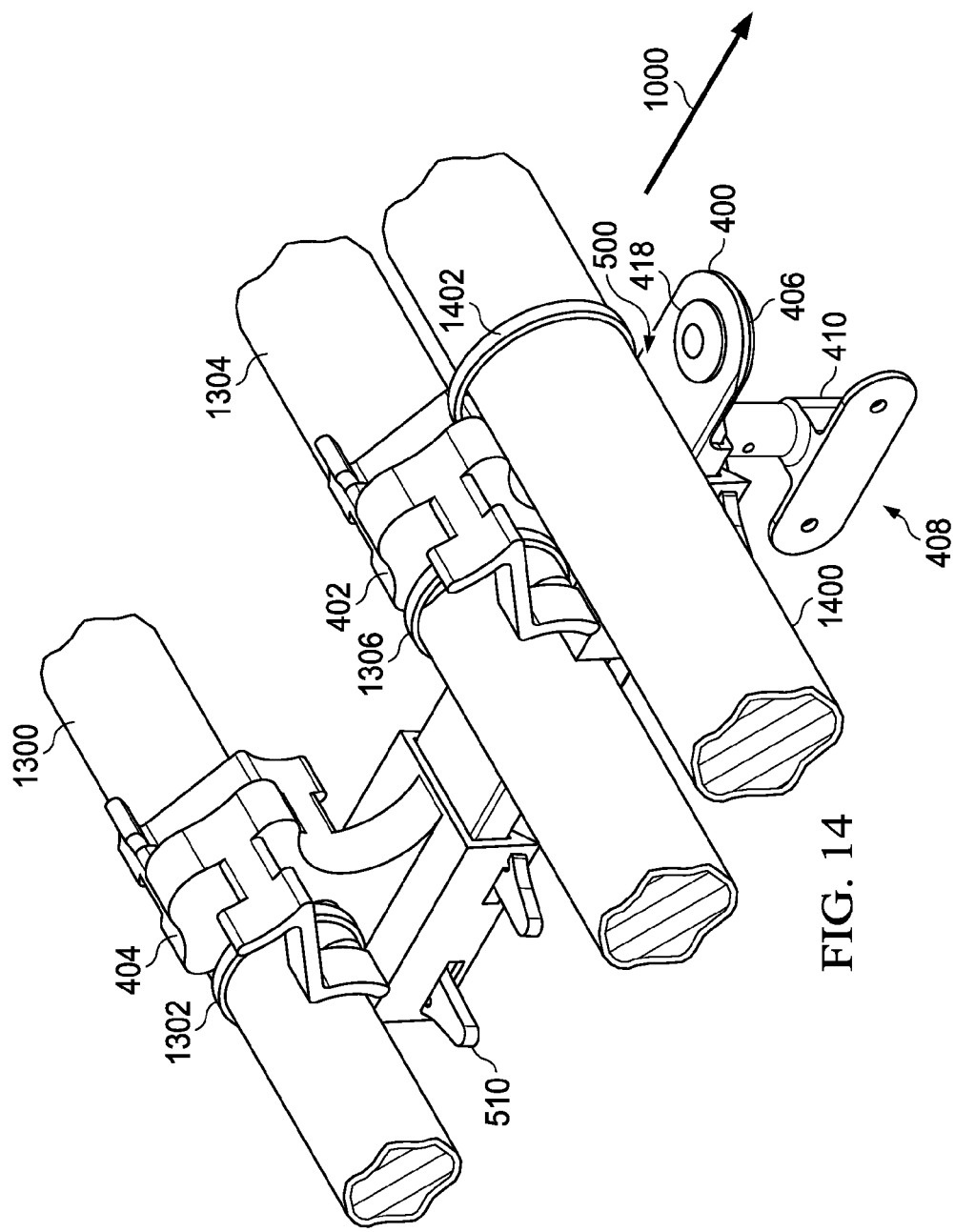
FIG. 14 is an illustration of wire bundles connected to spacers in a support structure in accordance with an illustrative embodiment.

With reference now to FIG. 14, an illustration of wire bundles connected to spacers in a support structure is depicted in accordance with an illustrative embodiment. In this illustrative example, wire bundle 1300 and wire bundle 1304 are connected to spacer 404 and spacer 402 prior to elongate member 406 being connected to bracket 414 in attachment structure 408.

In these illustrative examples, additional wire bundles may be connected to spacer 402 and spacer 404 after elongate member 406 has been connected to attachment structure 408. In this example, wire bundle 1400 is connected to spacer 402 after installation of elongate member 406. As depicted, wire bundle 1400 is connected to spacer 402 using tie 1402. In this example, removal of tie 1306 is not needed to connect wire bundle 1400 to spacer 402 based on the shape of spacer 402.

The connection of elongate member 406 to attachment structure 408 may be performed more easily due to the configuration to the channel 500. In other words, an operator does not have to look to see whether opening 504 is aligned to opening 506. Instead, when support structure 400 is no longer able to move in the direction of arrow 1000, these two openings are aligned with each other and ready to receive scrivet 418. Scrivet 418 is configured to be installed by an operator without needing a tool.

As a result, an operator may connect elongate member 406 to attachment structure 408 without seeing these components. In other word, the operator may perform the connection through the sense of touch. This capability may increase the speed at which wire bundles may be installed in a platform.

Figure 15:
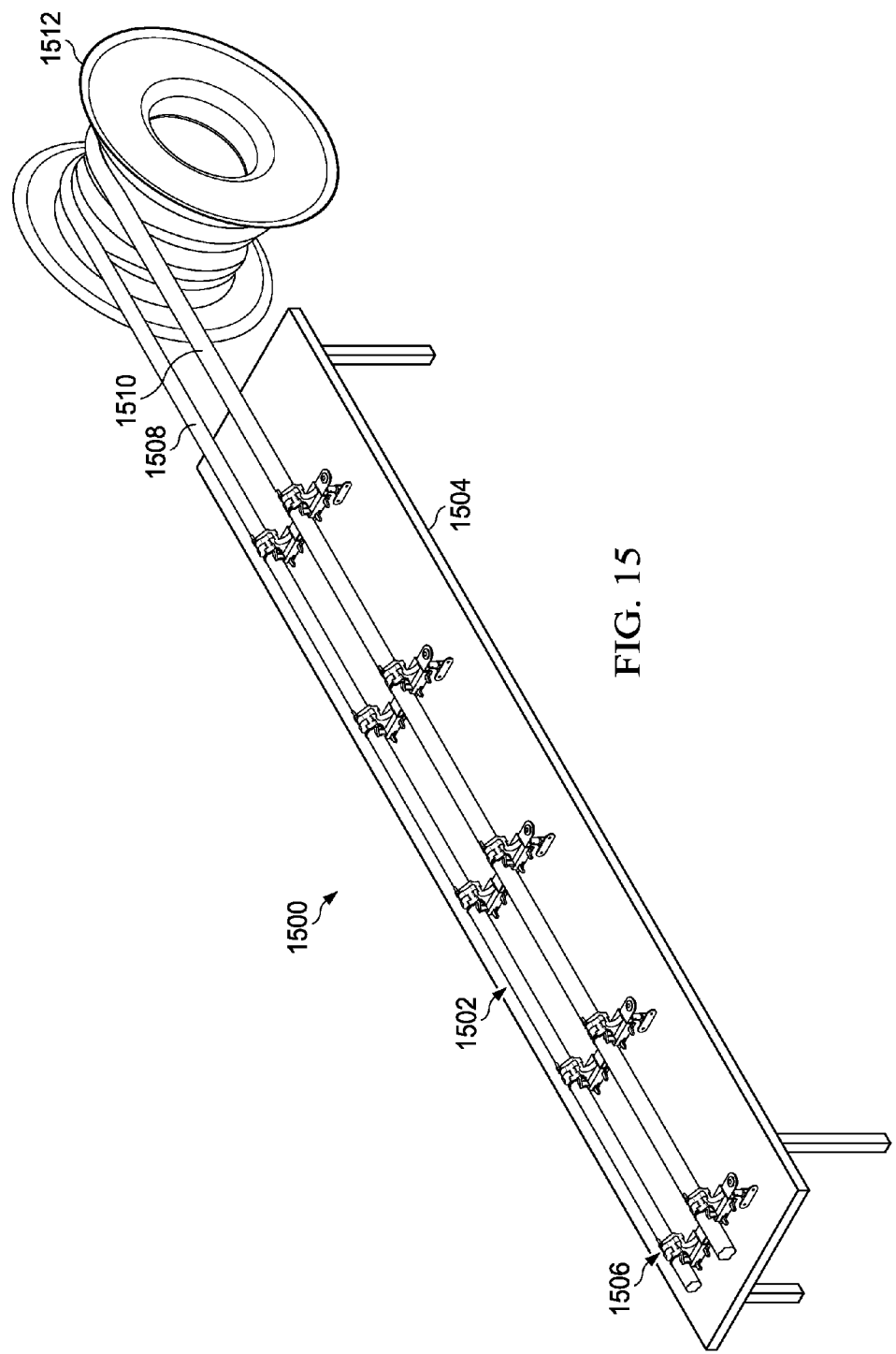
FIG. 15 is an illustration of an assembly of wire bundles with a line mounting system in accordance with an illustrative embodiment.

Turning now to FIG. 15, an illustration of an assembly of wire bundles with a line mounting system is depicted in accordance with an illustrative embodiment. In this illustrative example, line mounting system 1500 may be connected to wire bundles 1502 on table 1504. This connection of wire bundles 1502 to line mounting system 1500 occurs prior to the installation of line mounting system 1500 in a platform such as aircraft 100 in FIG. 1.

As depicted, support structures 1506 are connected to wire bundle 1508 and wire bundle 1510 in wire bundles 1502 on table 1504. Wire bundles 1502 connected to support structures 1506 in line mounting system 1500 may be rolled onto reel 1512. Reel 1512 may be moved to an interior of an aircraft and line mounting system 1500 with wire bundles 1502 may be installed into the aircraft.

Figure 16:
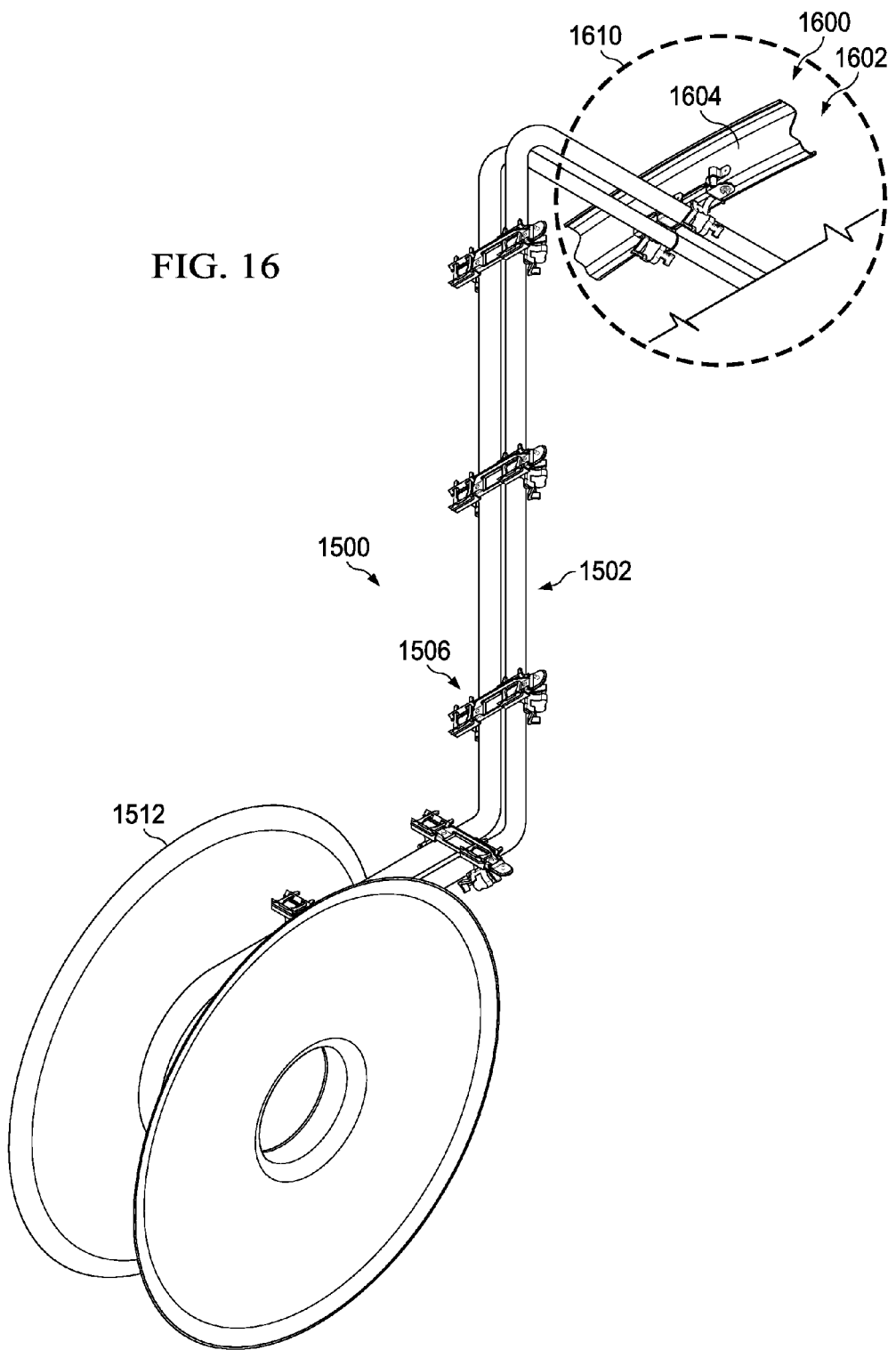
FIG. 16 is an illustration of the installation of a line mounting system in accordance with an illustrative embodiment.

Turning now to FIG. 16, an illustration of the installation of a line mounting system is depicted in accordance with an illustrative embodiment. In this illustrative example, line mounting system 1500 may be installed into interior 1600 of platform 1602.

As depicted, line mounting system 1500 with wire bundles 1502 may be unrolled from reel 1512 for installation. In this illustrative example, support structures 1506 in line mounting system 1500 are connected to attachment structures such as attachment structures 1604 in interior 1600 of platform 1602. A more detailed illustration of section 1610 is shown in FIG. 17 below.

Figure 17:
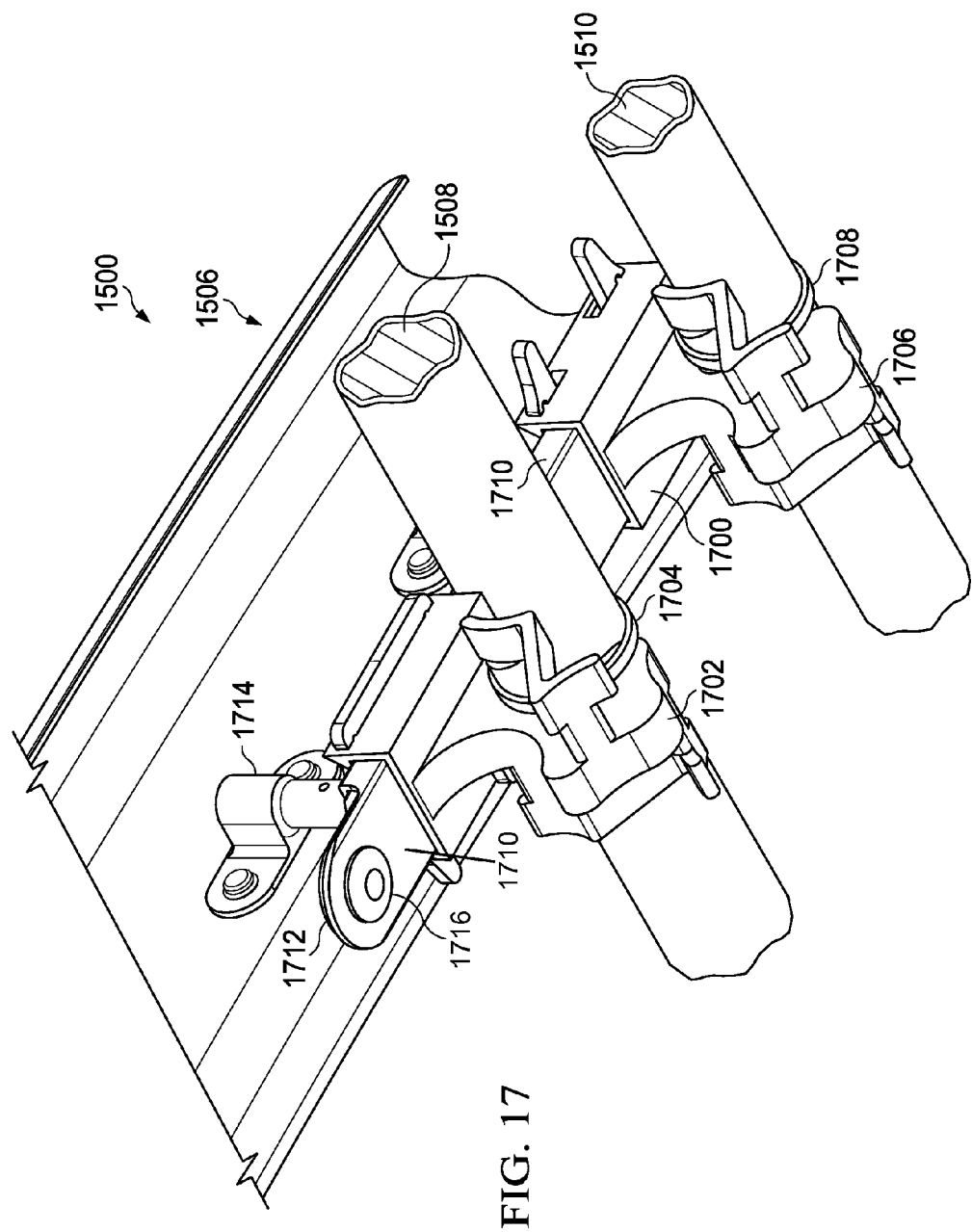
FIG. 17 is an illustration of a portion of a line mounting system installed in a platform in accordance with an illustrative embodiment.

With reference now to FIG. 17, an illustration of a portion of a line mounting system installed in a platform is depicted in accordance with an illustrative embodiment. In this illustrative example, support structure 1700 in support structures 1506 in line mounting system 1500 is illustrated. As can be seen, wire bundle 1508 is connected to spacer 1702 using tie 1704 and wire bundle 1510 is connected to spacer 1706 using tie 1708.

Support structures 1506 take the form of elongate member 1710 and is connected to bracket 1712 in attachment structure 1714. Scrivet 1716 holds elongate member 1710 in a desired position relative to bracket 1712.

Figure 18:
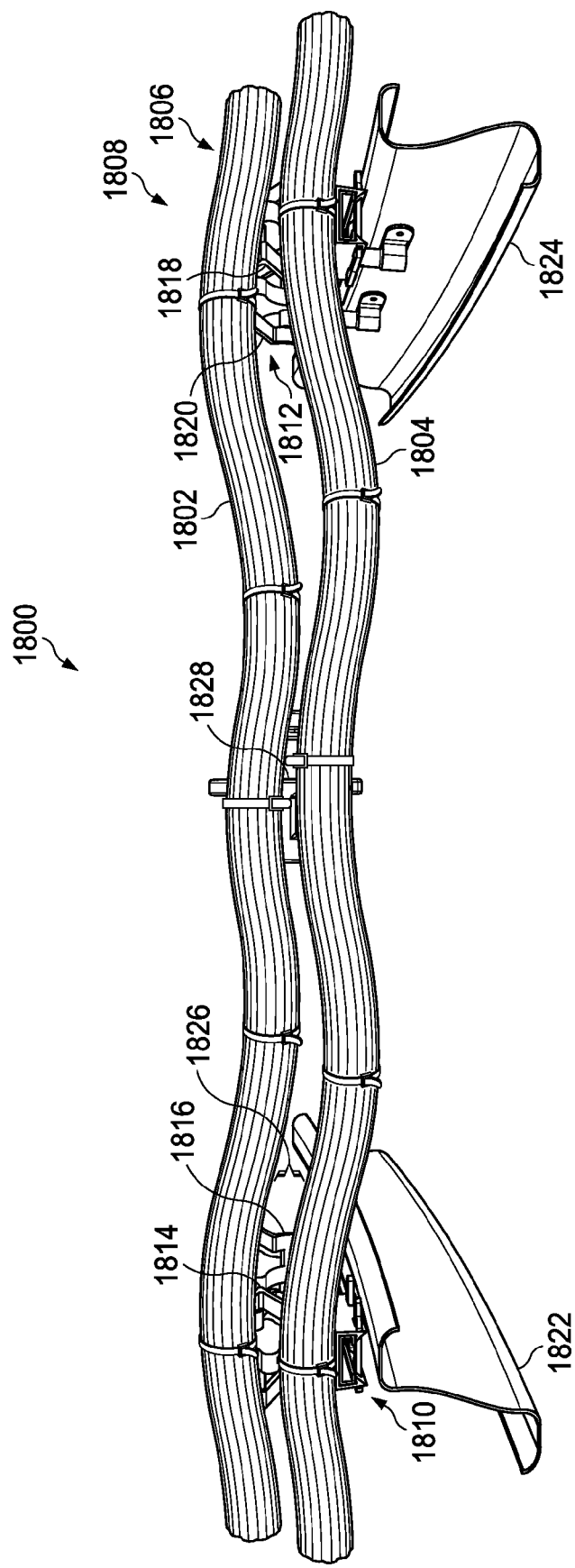
FIG. 18 is an illustration of a portion of a line mounting system installed in a platform in accordance with an illustrative embodiment.

Turning now to FIG. 18, an illustration of a portion of a line mounting system installed in a platform is depicted in accordance with an illustrative embodiment. A portion of line mounting system 1800 is shown in this view.

As depicted, line mounting system 1800 is configured to mount wire bundle 1802 and wire bundle 1804 to structure 1806 in platform 1808. In these illustrative examples, structure 1806 may be, for example, the bottom of floor 128 in aircraft 100 in FIG. 1.

In this illustrative example, line mounting system 1800 includes support structure 1810 and support structure 1812. Spacer 1814 and spacer 1816 are associated with support structure 1810. Spacer 1818 and spacer 1820 are associated with support structure 1812. Support structure 1810 is connected to attachment structure 1822, and support structure 1812 is connected to attachment structure 1824.

In this illustrative example, wire bundle 1802 and wire bundle 1804 are held in a desired configuration by line mounting system 1800. In particular, space 1826 may be maintained with a minimum desired value between wire bundle 1802 and wire bundle 1804 in this illustrative example. Space 1826 may be maintained using spacer 1814 and spacer 1816 associated with support structure 1812 and spacer 1818 and spacer 1820 associated with support structure 1810.

Additionally, space 1826 may be maintained between wire bundle 1802 and wire bundle 1804 using spacer 1828. Spacer 1828 is not connected to another structure in this illustrative example.

In these illustrative examples, space 1826 may be desired for a number of different reasons. For example, space 1826 may vary for different types of wires or numbers of wires in wire bundle 1802 and wire bundle 1804. If space 1826 is less than a desired value, interference may occur between signals sent through wires in wire bundle 1802 and wire bundle 1804. This interference may negatively affect the operation of systems sending and receiving signals using wire bundle 1802 and wire bundle 1804.

As a result, the use of spacer 1828 in addition to spacer 1818 and spacer 1820 associated with support structure 1812 and spacer 1818 and spacer 1820 associated with support structure 1810 may provide a desired configuration for space 1826 along the length of wire bundle 1802 and wire bundle 1804. The installation of spacers or additional brackets may be more time-consuming and costly than desired. Moreover, the installation of these structures may add more weight to the aircraft than desired.

Figure 19:
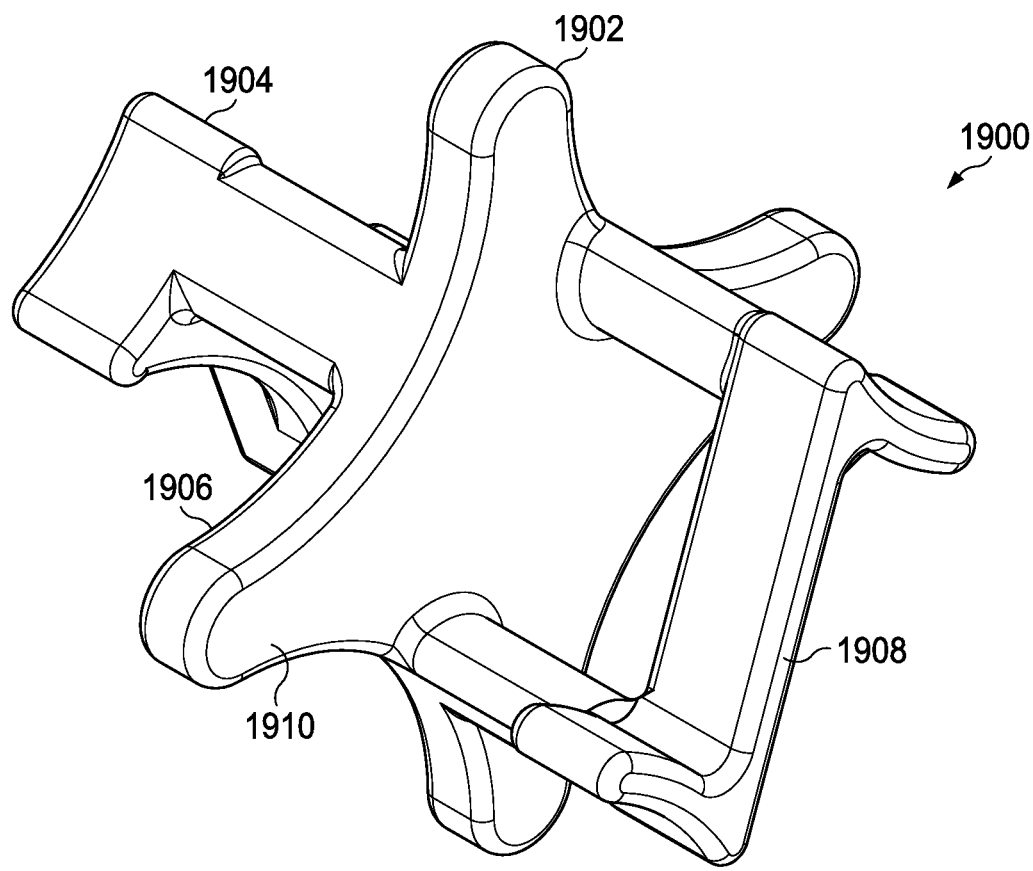
FIG. 19 is an illustration of a perspective view of a spacer in accordance with an illustrative embodiment.

Turning now to FIG. 19, an illustration of a perspective view of a spacer is depicted in accordance with an illustrative embodiment. In this illustrative example, spacer 1900 is an example of one implementation of spacer 1828 in FIG. 18.

As can be seen, spacer 1900 includes base 1902. Connecting structure 1904 extends from side 1906 of base 1902. Connecting structure 1908 extends from side 1910 of base 1902. These connecting structures may be used to connect wire bundles to spacer 1900 using fasteners, such as ties.

Figure 20:
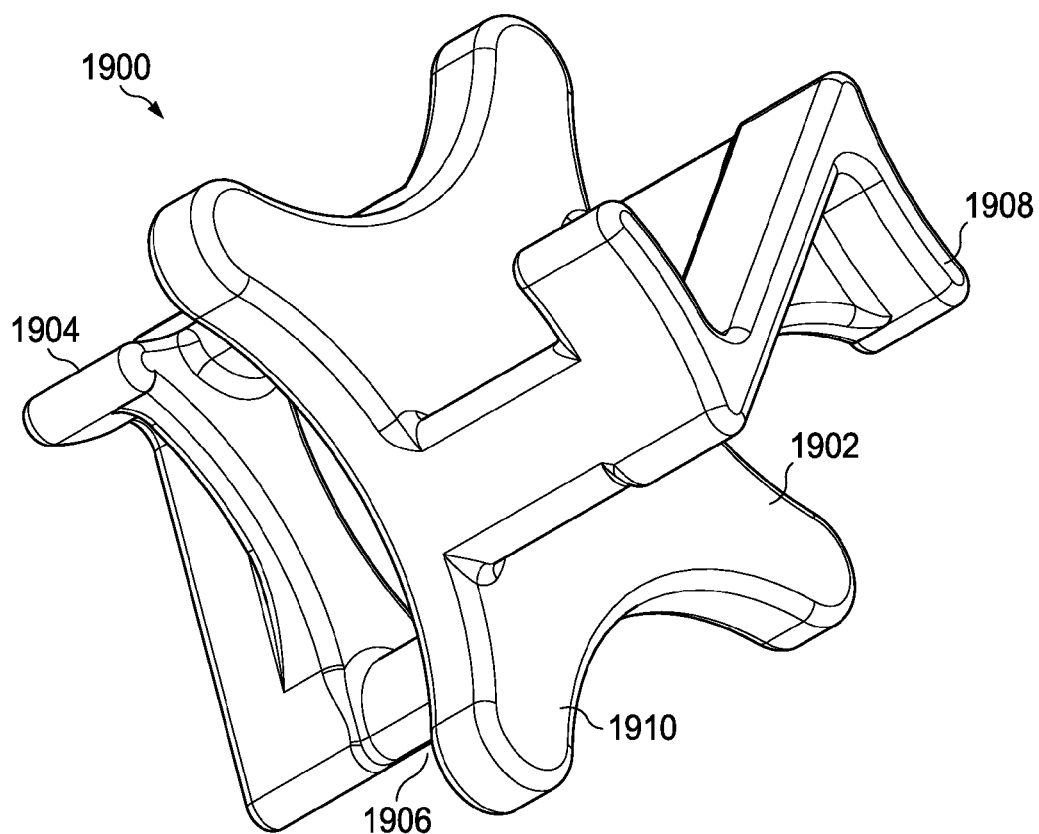
FIG. 20 is another illustration of a perspective view of a spacer in accordance with an illustrative embodiment.

Turning now to FIG. 20, another illustration of a perspective view of a spacer is depicted in accordance with an illustrative embodiment.

Figure 21:
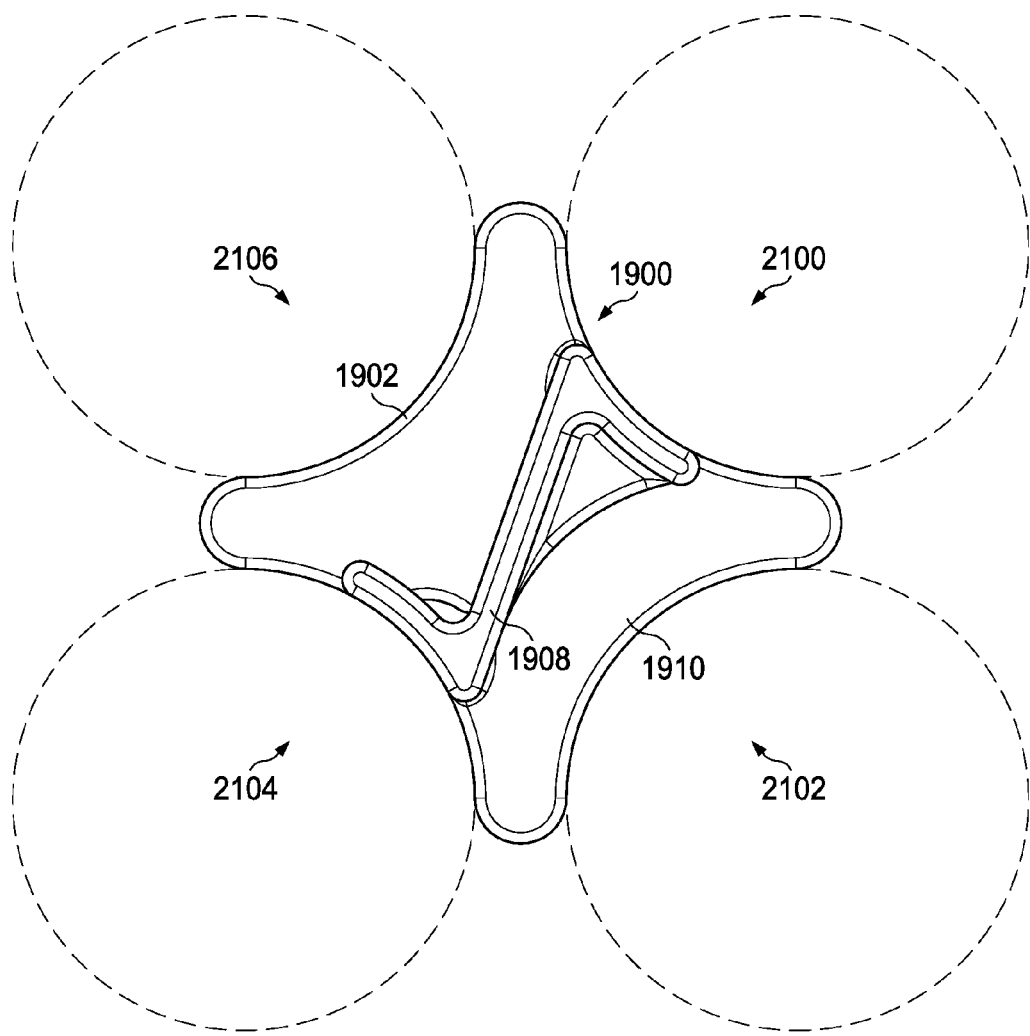
FIG. 21 is an illustration of a side view of a spacer in accordance with an illustrative embodiment.

With reference now to FIG. 21, an illustration of a side view of a spacer is depicted in accordance with an illustrative embodiment. In this figure, a view of side 1910 is illustrated. As can be seen from this view, wire bundles may be connected to connecting structure 1908 and connecting structure 1904 (not shown) at locations 2100, 2102, 2104, and 2106.

The illustrations of the different physical implementations for a line mounting system, such as line mounting system 202, and for different components in the line mounting system and aircraft 100 in FIG. 1 and FIGS. 4-21 are not meant to imply limitations to the manner in which other illustrative examples may be implemented. For example, although attachment structure 408 in FIG. 4 has been shown as three pieces that are connected to each other, attachment structure 408 may take other forms. For example, attachment structure 408 may be formed as a single piece in other illustrative examples.

In still another illustrative example, support structure 400 may take other forms other than elongate member 406 in FIG. 4. For example, support structure 400 may be oval or circular in shape. In still other illustrative examples, support structure 400 may be a square or hexagonal in shape. In the different possible embodiments, support structure 400 is configured to be connected to attachment structure 408 in FIG. 4. Even with the different shapes, support structure 400 may still include channel 500 in FIG. 5.

The different components shown in FIG. 1 and FIGS. 4-21 may be combined with components in FIG. 2 and FIG. 3, used with components in FIG. 2 and FIG. 3, or a combination of the two. Additionally, some of the components in FIG. 1 and FIGS. 4-21 may be illustrative examples of how components shown in block form in FIG. 2 and FIG. 3 can be implemented as physical structures.

Figure 22:
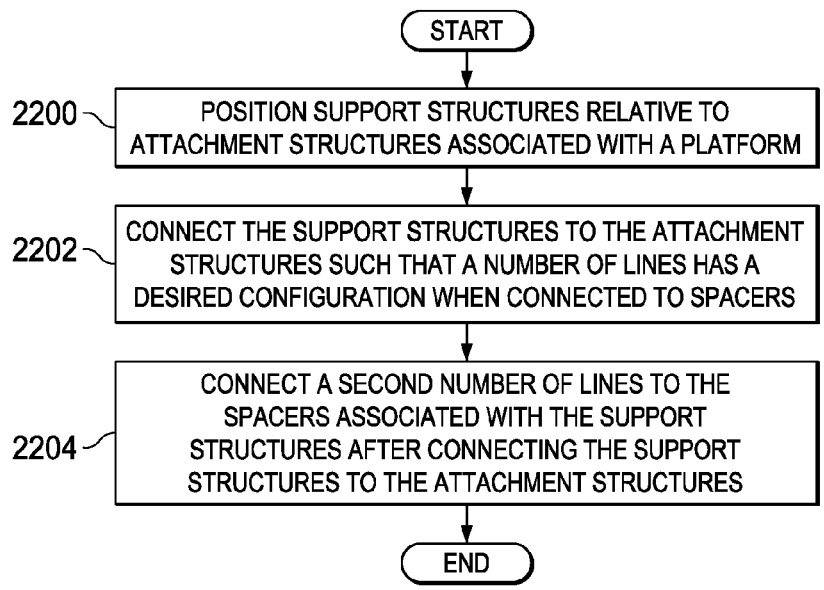
FIG. 22 is an illustration of a flowchart of a process for securing lines to a platform in accordance with an illustrative embodiment.

With reference now to FIG. 22, an illustration of a flowchart of a process for securing lines to a platform is depicted in accordance with an illustrative embodiment. The process illustrated in FIG. 22 may be implemented using line mounting system 202 in FIG. 2.

The process begins by positioning support structures relative to attachment structures associated with a platform (operation 2200). Spacers may be associated with the support structures. These spacers are configured to be connected to the number of lines. Next, the support structures are connected to the attachment structures such that a number of lines has a desired configuration when connected to spacers (operation 2202).

In operation 2200 and operation 2202, the number of lines may already be connected to the spacers prior to the support structures being connected to the attachment structures. In other illustrative examples, the number of lines may be connected to the spacers after the support structures have been connected to the attachment structures. Additionally, the number of lines may be grouped as one or more bundles.

When the number of lines are a first number of lines attached to the spacers, a second number of lines may be connected to the spacers associated with the support structures after connecting the support structures to the attachment structures (operation 2204) with the process terminating thereafter.

Figure 23:
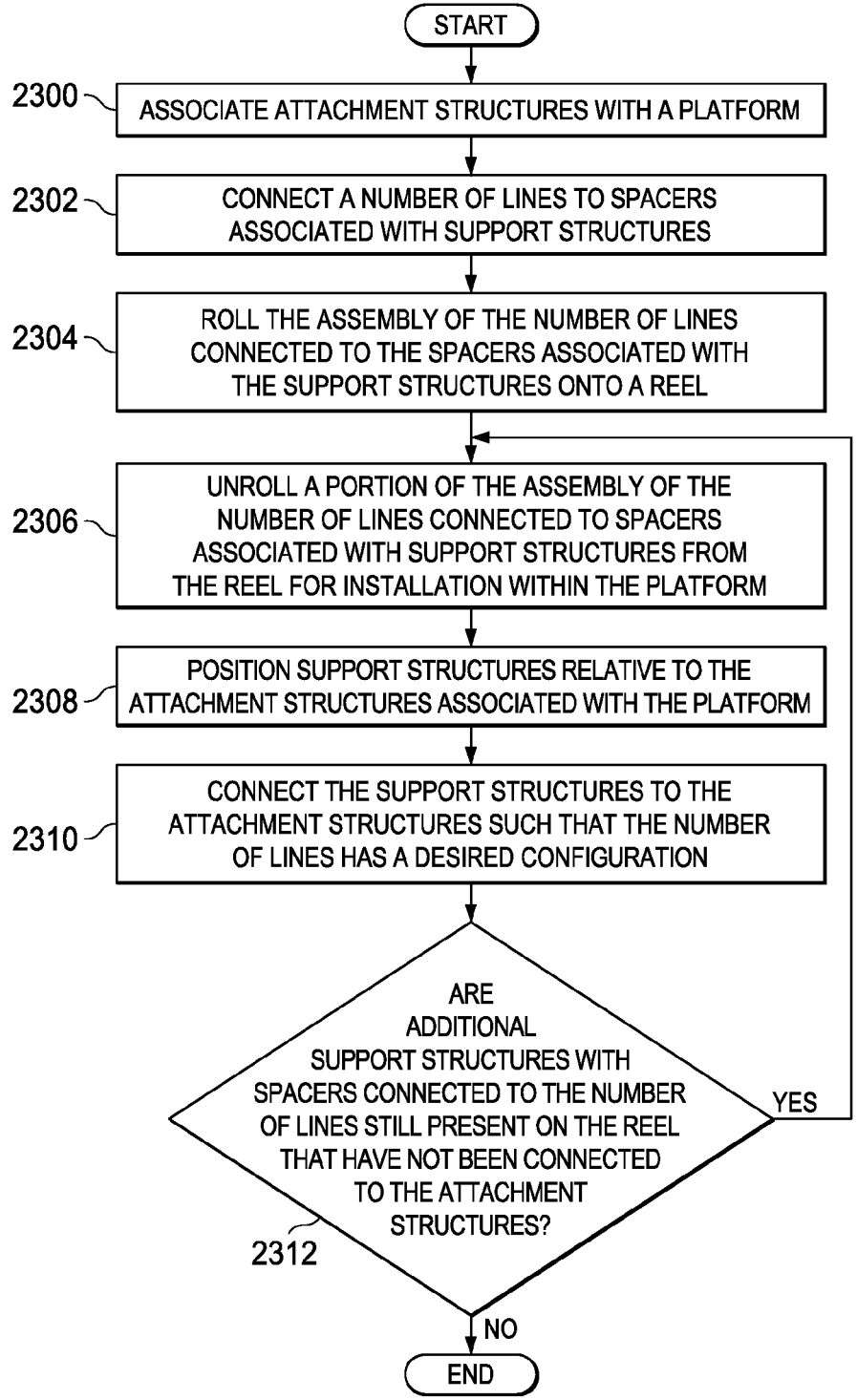
FIG. 23 is a more detailed illustration of a flowchart of a process for securing lines to a platform in accordance with an illustrative embodiment.

With reference now to FIG. 23, a more detailed illustration of a flowchart of a process for securing lines to a platform is depicted in accordance with an illustrative embodiment. The process illustrated in FIG. 23 may be implemented using line mounting system 202 in FIG. 2.

The process begins by associating attachment structures with a platform (operation 2300). In operation 2300, the attachment structures are connected to the platform in locations where lines, such as wires or other transport elements, are to be located.

The process then connects a number of lines to spacers associated with support structures (operation 2302). The assembly of the number of lines connected to the spacers associated with the support structures are rolled onto a reel (operation 2304).

Within the platform, a portion of the assembly of the number of lines connected to spacers associated with support structures is unrolled from the reel for installation in the platform (operation 2306). Support structures are positioned relative to the attachment structures associated with the platform (operation 2308). The support structures positioned in operation 2308 are support structures that have been unrolled from the reel with the number of lines connected to spacers associated with the support structures.

The process then connects the support structures to the attachment structures such that the number of lines has a desired configuration (operation 2310). The connection may be made using fasteners that do not require the use of a tool. Further, the alignment of the support structures to the attachment structures also may not require visual inspection by the operator.

In this illustrative example, the desired configuration may be where the number of lines are located and spacing between the number of lines. In particular, the spacing may be spacing between two or more wire bundles.

A determination is made as to whether additional support structures with spacers connected to the number of lines are still present on the reel that have not been connected to the attachment structures (operation 2312). If additional support structures are present, the process returns to operation 2306. Otherwise, the process terminates.

This process allows for the installation of additional lines after the initial installation of the number of lines connected to spacers associated with the support structures on the reel. The installation of additional lines may be made without removing fasteners such as ties from the already installed number of lines in these illustrative examples.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

In one illustrative example, operation 2204 in FIG. 22 is an optional operation. In other words, the attachment of additional line bundles may not be needed and operation 2204 may be omitted.

In another illustrative example, operation 2300 and operation 2302 in FIG. 23 may be performed at the same time or may be performed in a different order. In still other illustrative examples, the support structures may be connected to the attachment structures first. The number of lines may then be connected to the spacers associated with the support structures afterwards depending on the particular implementation.

Illustrative embodiments of the disclosure may be described in the context of aircraft manufacturing and service method 2400 as shown in FIG. 24 and aircraft 2500 as shown in FIG. 25. Turning first to FIG. 24, an illustration of an aircraft manufacturing and service method is depicted in accordance with an illustrative embodiment. The process depicted in FIG. 24 may be used during manufacturing and service of aircraft 100 in FIG. 1. During pre-production, aircraft manufacturing and service method 2400 may include specification and design 2402 of aircraft 2500 in FIG. 25 and material procurement 2404.

During production, component and subassembly manufacturing 2406 and system integration 2408 of aircraft 2500 in FIG. 25 takes place. Thereafter, aircraft 2500 in FIG. 25 may go through certification and delivery 2410 in order to be placed in service 2412. While in service 2412 by a customer, aircraft 2500 in FIG. 25 is scheduled for routine maintenance and service 2414, which may include modification, reconfiguration, refurbishment, and other maintenance or service.

Each of the processes of aircraft manufacturing and service method 2400 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 25, an illustration of an aircraft is depicted in which an illustrative embodiment may be implemented. In this example, aircraft 2500 is produced by aircraft manufacturing and service method 2400 in FIG. 24 and may include airframe 2502 with plurality of systems 2504 and interior 2506. Examples of systems 2504 include one or more of propulsion system 2508, electrical system 2510, hydraulic system 2512, and environmental system 2514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 2400 in FIG. 24. In one illustrative example, components for a line mounting system may be assembled during components and subassembly manufacturing 2406. Wire bundles or other groupings of lines may be connected to the line mounting system prior to installation in aircraft 2500 as part of system integration 2408.

In still other illustrative examples, the line mounting system in accordance with an illustrative embodiment may be manufactured and installed during maintenance and service 2414. The use of a number of the different illustrative embodiments may substantially expedite the assembly of and/or reduce the cost of aircraft 2500.

Thus, one or more illustrative embodiments provide a method and apparatus for mounting lines in a desired configuration. In these illustrative examples, different types of lines may be mounted within a platform using a line mounting system, such as line mounting system 202 in FIG. 2.

With the use of line mounting system 202 in FIG. 2, the installation of lines, such as wires, air hoses, fluid lines, and other types of lines may be performed with less effort and less time. With line mounting system 202, the use of tools by an operator may be avoided. Further, the operator also may not need to see the different components in line mounting system 202 to install the lines. For example, an operator may not need to look to see whether a hull in a support structure lines up with a hull in an attachment structure before installing a fastener in the hulls to maintain a desired position between the support structure and the attachment structure.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A line mounting system for an aircraft, the line mounting system comprising:
   a reel;
   a number of lines;
   support structures configured to slide into positions relative to attachment structures in the aircraft and connect to the attachment structures in the positions; and
   spacers connected to the support structures, wherein the number of lines is configured to be connected to the spacers, wherein the number of lines is held in a desired configuration in the aircraft when the support structures are secured to the attachment structures; and
   an assembly comprising the number of lines connected to the spacers and the support structures, wherein the assembly is rolled onto the reel;
   wherein a support structure in the support structures comprises an elongate structure and a spacer in the spacers is connected to the elongate structure using a clip.

2. The line mounting system of claim 1, wherein the elongate structure has a channel configured to receive a portion of an attachment structure in the attachment structures when the support structure is in a position in the positions.

3. The line mounting system of claim 1, wherein the number of lines is connected to the spacers prior to the support structures being slid into the positions relative to the attachment structures in the aircraft.

4. The line mounting system of claim 3, wherein the number of lines is a first number of lines and further comprising:
   a second number of lines configured to be connected to the spacers after the support structures are secured to the attachment structures in the aircraft.

5. The line mounting system of claim 1 further comprising:
   fasteners configured to secure the support structures to the attachment structures in the positions relative to the attachment structures in the aircraft.

6. The line mounting system of claim 5, wherein the fasteners are configured to secure the support structures to the attachment structures in the positions relative to the attachment structures without a tool.

7. The line mounting system of claim 5, wherein the fasteners comprise scrivets.

8. A method for mounting lines in an aircraft, the method comprising:
   associating attachment structures with an interior of a fuselage of the aircraft;
   assembling an assembly comprising a number of lines connected to spacers and support structures;
   rolling the assembly onto a reel;
   moving the support structures to positions relative to the attachment structures;
   connecting the support structures to the attachment structures when the support structures are in the positions relative to the attachment structures such that the number of lines has a desired configuration in the fuselage of the aircraft when connected to the spacers; and
   wherein a support structure in the support structures comprises an elongate structure and a spacer in the spacers is connected to the elongate structure using a clip.

9. The method of claim 8, wherein the number of lines is a first number of lines and further comprising:
   connecting a second number of lines to the spacers with the support structures after connecting the support structures to the attachment structures.

10. The method of claim 8 further comprising:
    connecting the number of lines to the spacers prior to connecting the support structures to the attachment structures.

11. The method of claim 8, further comprising:
    connecting the number of lines to the spacers after connecting the support structures relative to the attachment structures.

12. The method of claim 8, wherein connecting the support structures to the attachment structures such that the number of lines has the desired configuration when connected to the spacers comprises:
    connecting the support structures to the attachment structures such that the number of lines has the desired configuration when connected to the spacers without using a tool.

13. The method of claim 8, wherein a support structure in the support structures is connected to an attachment structure in the attachment structures with a fastener.

14. The method of claim 8, wherein a spacer in the spacers has a number of locations in which a location in the number of locations is configured to receive a portion of the number of lines and hold the portion of the number of lines when a fastener connects the portion of the number of lines to the spacer in the location.

15. The method of claim 8, wherein the desired configuration is a desired minimum distance between the lines in the number of lines.

16. The method of claim 8, wherein the elongate structure has a channel configured to receive a portion of an attachment structure in the attachment structures when the support structure is moved to a position in the positions for the support structures relative to the attachment structure.

17. A method for mounting lines in a platform, the method comprising:
    assembling an assembly comprising a number of lines connected to spacers and support structures;
    rolling the assembly onto a reel;
    unrolling the reel to position the support structures relative to attachment structures associated with the platform, wherein the spacers are associated with the support structures and the spacers are configured to be connected to the number of lines; and
    connecting the support structures to the attachment structures such that the number of lines has a desired configuration when connected to the spacers;
    wherein a support structure in the support structures comprises an elongate structure and a spacer in the spacers is connected to the elongate structure using a clip.

18. The method of claim 17, further comprising:
    connecting a second number of lines to the spacers with the support structures after connecting the support structures to the attachment structures.

19. The method of claim 17 further comprising:
    connecting the number of lines to the spacers prior to positioning the support structures relative to the attachment structures.

20. The method of claim 17 further comprising:
    connecting the number of lines to the spacers after positioning the support structures relative to the attachment structures.

21. The line mounting system of claim 1,
wherein the spacer is configured to hold at least three lines of the number of lines;
wherein the support structure is connected to the spacer and a second spacer and the support structure is connected to a bracket of each of the attachment structures;
wherein an attachment structure of the attachment structures comprises a bracket, a first post, and a second post, with the first post connected to the bracket with a first fastener and the second post connected to the bracket with a second fastener;
wherein the clip and a second clip stop movement of the elongate structure relative to the attachment structure when an opening in the elongate structure is aligned with an opening in the bracket of the attachment structure; and
wherein the first post contacts the clip and the second post contacts the second clip to stop the movement of the elongate structure along the attachment structure.

* * * * *